US009300156B2

(12) United States Patent
Nishibayashi et al.

(10) Patent No.: US 9,300,156 B2
(45) Date of Patent: Mar. 29, 2016

(54) CHARGE/DISCHARGE INSTRUCTING APPARATUS AND NON-TRANSITORY COMPUTER READABLE MEDIUM

(71) Applicant: KABUSHIKI KAISHA TOSHIBA, Tokyo (JP)

(72) Inventors: Yasuyuki Nishibayashi, Kawasaki (JP); Keiichi Teramoto, Tokyo (JP); Kotaro Ise, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 207 days.

(21) Appl. No.: 13/963,222

(22) Filed: Aug. 9, 2013

(65) Prior Publication Data
US 2014/0042978 A1 Feb. 13, 2014

(30) Foreign Application Priority Data

Aug. 10, 2012 (JP) ................................. 2012-179040

(51) Int. Cl.
*H02J 7/00* (2006.01)
*H02J 3/32* (2006.01)
*H02J 7/04* (2006.01)
*H02J 13/00* (2006.01)

(52) U.S. Cl.
CPC . *H02J 7/007* (2013.01); *H02J 3/32* (2013.01); *H02J 7/0013* (2013.01); *H02J 7/041* (2013.01); *H02J 13/0062* (2013.01); *H02J 13/0079* (2013.01); *Y02E 60/721* (2013.01); *Y02T 90/168* (2013.01); *Y04S 10/126* (2013.01); *Y04S 30/12* (2013.01)

(58) Field of Classification Search
USPC ......................................................... 320/134
See application file for complete search history.

(56) References Cited

U.S. PATENT DOCUMENTS

| 6,639,383 | B2 | 10/2003 | Nelson et al. | |
|---|---|---|---|---|
| 2003/0052644 | A1* | 3/2003 | Nelson et al. | 320/107 |
| 2011/0248678 | A1* | 10/2011 | Wade et al. | 320/119 |
| 2012/0249048 | A1* | 10/2012 | Nishibayashi et al. | 320/101 |
| 2014/0031999 | A1* | 1/2014 | Oe | 700/291 |

FOREIGN PATENT DOCUMENTS

| JP | 4920123 | 2/2012 |
|---|---|---|
| JP | 2012-130106 | 7/2012 |

OTHER PUBLICATIONS

Office Action dated Sep. 5, 2014 in counterpart JP Application No. 2012-179040 and partial English-language translation of same.

* cited by examiner

*Primary Examiner* — Mohammed Alam
(74) *Attorney, Agent, or Firm* — Nixon & Vanderhye, P.C.

(57) ABSTRACT

In one embodiment, there is provided a charge-discharge instructing apparatus. The apparatus includes: an acquiring module configured to acquire specific information and location information for each of a plurality of battery energy storage systems, wherein the specific information represents an electrical characteristic of a battery of each of the battery energy storage systems, and the location information represents an installation position of each of the battery energy storage systems; a group determining module configured to select some of the battery energy storage systems from among the plurality of battery energy storage systems to make a group composed of the selected battery energy storage systems, based on the specific information and the location information; and a managing module configured to send a charge-discharge control instruction to the battery energy storage systems belonging to the group.

16 Claims, 23 Drawing Sheets

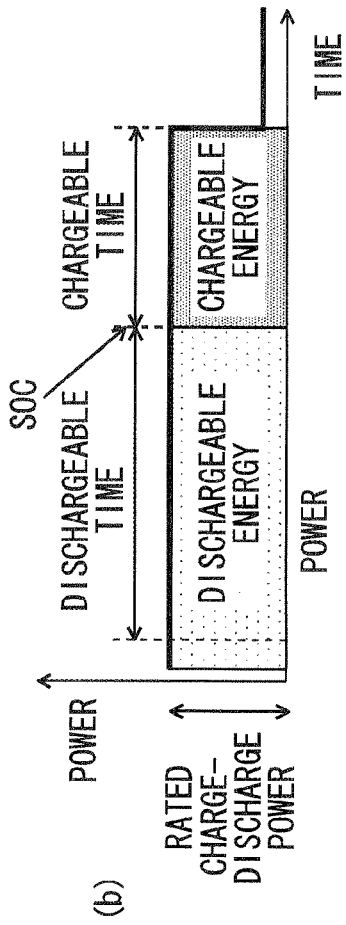

FIG. 8A

| EXAMPLE CONFIGURATION OF CHARGE-DISCHARGE GROUP MANAGEMENT INFORMATION | |
|---|---|
| BATTERY ENERGY STORAGE SYSTEM GROUP (1) | BATTERY ENERGY STORAGE SYSTEM A, BATTERY ENERGY STORAGE SYSTEM B, BATTERY ENERGY STORAGE SYSTEM C |
| BATTERY ENERGY STORAGE SYSTEM GROUP (2) | BATTERY ENERGY STORAGE SYSTEM D |
| BATTERY ENERGY STORAGE SYSTEM GROUP (3) | BATTERY ENERGY STORAGE SYSTEM E, BATTERY ENERGY STORAGE SYSTEM F |
| ⋯ | ⋯ |

FIG. 8B

| TCP/IP HEADER | IDENTIFIER | NUMBER | BATTERY IDENTIFIERS |
|---|---|---|---|

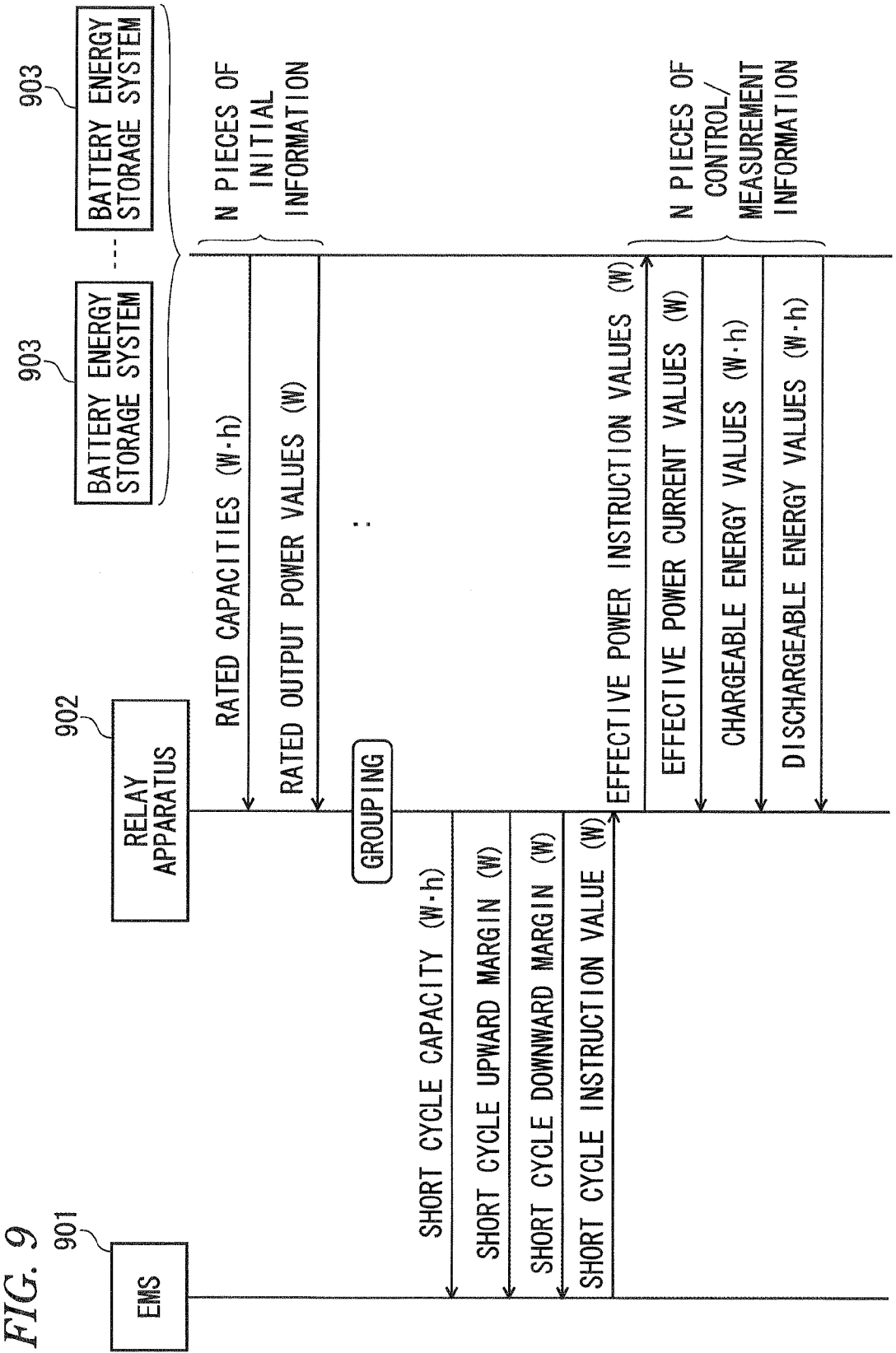

FIG. 13

| FUNCTION | SPECIFIC CONDITION | LOCATION CONDITION |
|---|---|---|
| SHORT CYCLE CONTROL | VARIATION RATE (OUTPUT POWER (W)) | VERY CLOSE (E.G., WITHIN 100 M) |
| DAYTIME OPERATION CONTROL | BATTERY CAPACITY (RESERVE POWER) (%) | SOMEWHAT CLOSE (E.G., WITHIN 5 KM) |
| .. | .. | .. |

FIG. 18

| EXAMPLE CONFIGURATION OF CHARGE-DISCHARGE POWER INFORMATION | |
|---|---|
| RATED DISCHARGE POWER | P (W) |
| RATED CHARGING POWER | P (W) |
| DISCHARGEABLE TIME | α (h) ※ UPDATED WHEN NECESSARY AS CHARGING OR DISCHARGE PROCEEDS |
| CHARGEABLE TIME | β (h) ※ UPDATED WHEN NECESSARY AS CHARGING OR DISCHARGE PROCEEDS |
| PERMITTED ELECTRIC ENERGY | EMS: DISCHARGE TIME t1, DISCHARGE POWER p1 |

| TCP/IP HEADER | IDENTIFIER | BATTERY SPECIFIC INFORMATION | LOCATION INFORMATION |

(b)

| TCP/IP HEADER | IDENTIFIER | START TIME | END TIME | CHARGE-DISCHARGE POWER |

CHARGE/DISCHARGE INSTRUCTING APPARATUS AND NON-TRANSITORY COMPUTER READABLE MEDIUM

This application claims priority from Japanese Patent Application No. 2012-179040, filed on Aug. 10, 2012, the entire contents of which are hereby incorporated by reference.

BACKGROUND

1. Technical Field

Embodiments described herein relate to a charge-discharge instructing apparatus and a non-transitory computer readable medium.

2. Description of the Related Art

In recent years, smart grid systems which perform power management and control using a power network and a communications network have come to be constructed in systems including a power system network (a power plant, a natural energy power plant, a battery energy storage system, and an EMS (energy management system)) and user-side systems (each includes a smart meter, a battery energy storage system, a user-side EMS (e.g., HEMS (home energy management system)).

In smart grid systems, battery energy storage systems provide power stably even in a case that a natural energy power plant having a large output variation is added to a power network and thus play an important role in preventing a power failure.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention:

FIG. 7A shows examples of various kinds of information which are stored in a battery information storage module 603 shown in FIG. 6;

FIG. 8A shows an example method of management, performed by a charge-discharge group determining module 604, of groups of battery energy storage systems;

FIG. 8B shows an example charge-discharge instruction message;

FIG. 9 is an operation sequence diagram of short cycle control of the charge-discharge instructing apparatus 600;

FIG. 13 shows example sets of a specific condition and a location condition;

FIG. 18 shows an example configuration of charge-discharge power information; and FIG. 19 shows communication messages to be exchanged between the charge-discharge instructing apparatus 600 and the charge-discharge determining apparatus 1600.

DETAILED DESCRIPTION

Figure 1:
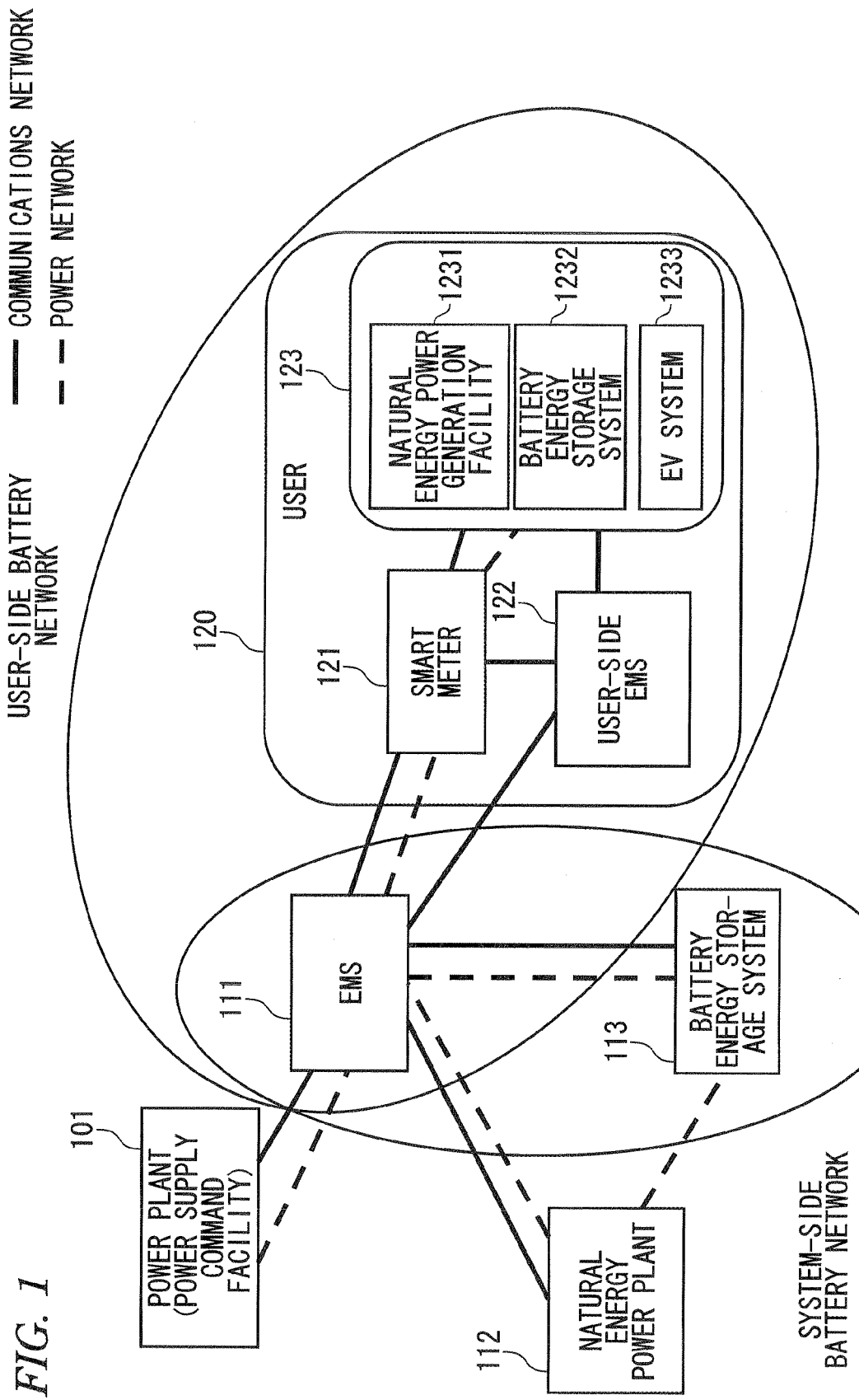
FIG. 1 is a block diagram showing the configuration of a whole system of an embodiment of the present invention.

According to exemplary embodiments of the present invention, there is provided a charge-discharge instructing apparatus. The apparatus includes: an acquiring module configured to acquire specific information and location information for each of a plurality of battery energy storage systems, wherein the specific information represents an electrical characteristic of a battery of each of the battery energy storage systems, and the location information represents an installation position of each of the battery energy storage systems; a group determining module configured to select some of the battery energy storage systems from among the plurality of battery energy storage systems to make a group composed of the selected battery energy storage systems, based on the specific information and the location information; and a managing module configured to send a charge-discharge control instruction to the battery energy storage systems belonging to the group.

An embodiment of the present invention will be hereinafter described with reference to the drawings. The same items in the drawings are given the same reference symbol and will not be described redundantly.

FIG. 1 shows a whole system including a charge-discharge instructing apparatus according to the embodiment. In the embodiment, for example, a charge-discharge instructing apparatus provided in an EMS (energy management system) 111 selects, to form a group, some battery energy storage systems from plural battery energy storage systems on the basis of pieces of specific information indicating electrical characteristics of the batteries of the plural battery energy storage systems and pieces of location information indicating locations of the plural battery energy storage systems and performs charge-discharge controls on the selected battery energy storage systems belonging to the group.

First, the configuration of this whole system including the charge-discharge instructing apparatus 111 according to the embodiment will be described below. In the whole system, a power plant (power supply command facility) 101, an EMS (energy management system) 111, a natural energy power plant 112, and a battery energy storage system 113 are provided on a power system network. A smart meter 121, a user-side EMS 122, and a user-side power system 123 are provided on the side of each user 120. The user-side power system 123 is provided with a natural energy power generation facility 1231, a battery energy storage system 1232, and an EV (electric vehicle) system 1233

The power plant (power supply command facility) 101 generates a large amount of power by thermal power generation, atomic power generation, or the like and supplies the generated power to the users 120 such as homes, buildings, and factories through power transmission and distribution networks. In the embodiment, the power transmission and distribution networks from the power plant 101 to the users 120 are generically called a power system network.

The natural energy power plant 112 generates power using naturally occurring power such as wind power or solar power and supplies the generated power to the users 120 through the power transmission and distribution networks. Installing the natural energy power plant 112 in the power system network makes it possible to reduce the load of the power plant 101 and operate it efficiently.

The battery energy storage system 113 stores surplus power generated by the power plant 101 and the natural energy power plant 112, and discharges stored power. In general, on the side of a power company, the battery energy storage system 113 is used for realizing a function called an ancillary service (short cycle control) for stabilizing the power company power system by adjusting the output in order of seconds in response to instantaneous load variations to maintain necessary quality of electricity such as the frequency and the voltage of the power company power system. On the side of the users 120 such as homes and buildings, the battery energy storage system 113 is used for realizing a function called a peak shift (daytime operation) function of storing nighttime electric energy which is low in cost and supplying it in a daytime time slot in which power demands are concentrated.

Utilizing both of a power network and a communications network, the EMS 111 controls the entire power system including the power supplied by each of the power plant 101 and the natural energy power generation facility 112 and the load power consumed by the users 120, to stabilize the entire power system. The functions of the charge-discharge instructing apparatus according to the embodiment are provided in the EMS 111. A detailed configuration of the charge-discharge instructing apparatus will be described later.

The smart meter 121 measures electric energy consumed in the facilities of each user 120 and communicates the measured electric energy values to a management server of the power company on a regular basis. The management server (generally called an MDMS (metering data management system)) is omitted in FIG. 1. The above-described EMS 111 cooperates with the MDMS to calculate a total amount of load power of the users 120.

The battery energy storage system 1232 which is installed in the facilities of each user 120 stores electric energy that is supplied from the power company power system network or electric energy that is generated by the natural energy power generation facility 1231 which is installed in the facilities of the user 120.

The EV system 1233 stores electric energy in the battery provided therein via a charger 250 (described later).

The user-side EMS 122 adjusts and controls the power consumption of the user 120. Where the user 120 is a home, a HEMS adjusts and controls the power consumption of the home. Where the user 120 is a building, a BEMS adjusts and controls the power consumption of the building. Where the user 120 is a factory, a FEMS (factory management system) adjusts and controls the power consumption of the factory. The description of the configuration of the entire system ends here.

Figure 2:
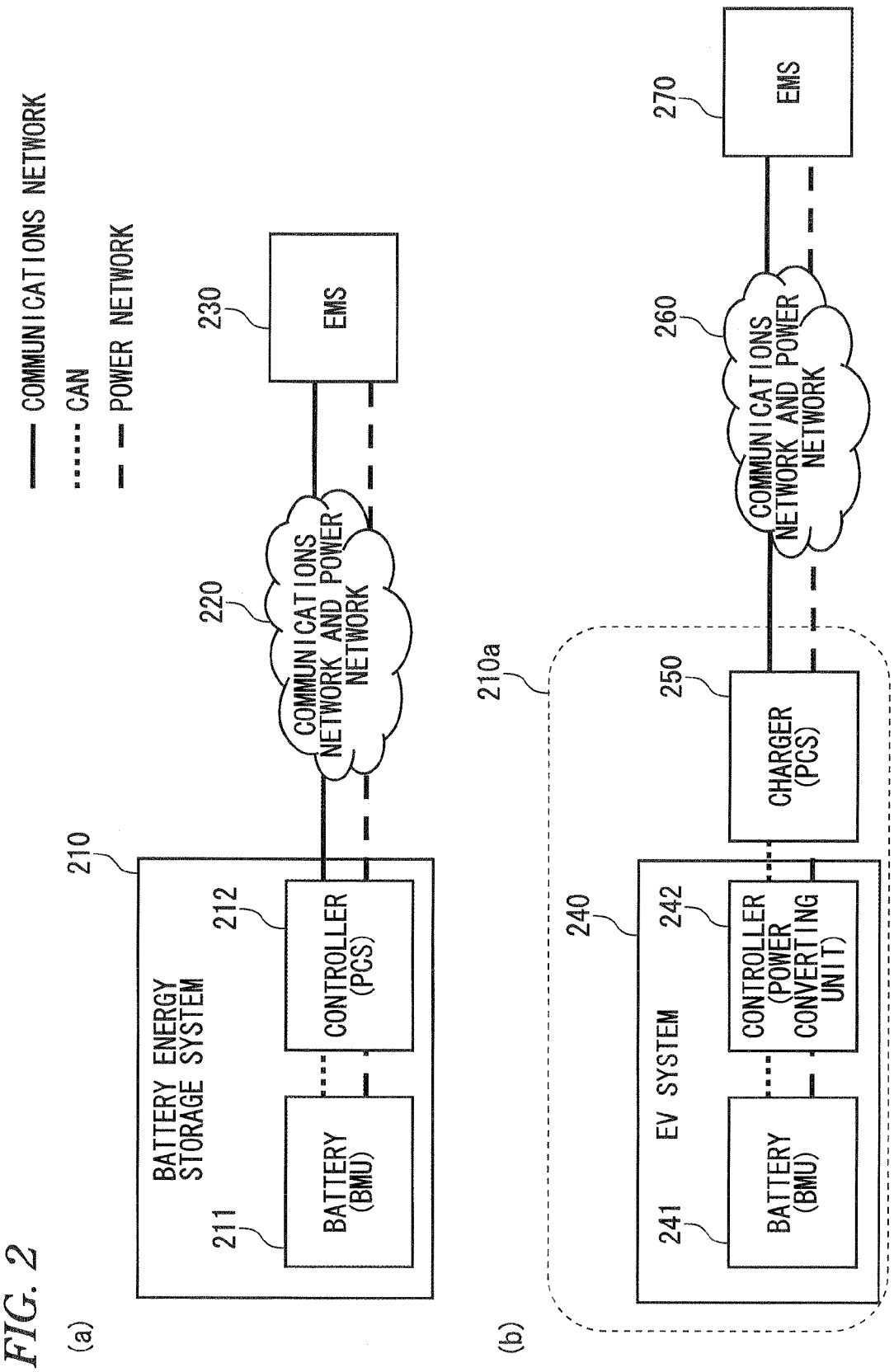
FIG. 2 is a block diagram showing the configurations of a battery energy storage system 210 and an EV system 240 according to the embodiment.

Next, a description will be made of the battery energy storage systems 113 and 1232 and the EV system 1233 shown in FIG. 1. FIG. 2 shows the configurations of a battery energy storage system 210 and an EV system 240 according to the embodiment. The battery energy storage system 210 shown in FIG. 2(a) corresponds to each of the battery energy storage systems 113 and 1232 shown in FIG. 1, and the EV system 240 shown in FIG. 2(b) corresponds to the EV system 1233 shown in FIG. 1. It is assumed that the battery energy storage system 210 is mainly used as a stationary system and the EV system 240 is mainly used as a vehicular system.

The battery energy storage system 210 and the EV system 240 shown in FIG. 2 are each equipped with a battery (BMU: battery management unit). Alternatively, a natural energy power generator (wind power, solar power, or the like) may be used instead of the battery.

The battery energy storage system 210 is equipped with a battery (BMU) 211 and a controller (power converting unit) 212.

The battery 211 is equipped with plural battery cells and an internal processor for managing the internal state of a battery pack. The battery 211 charges or discharges power according to an instruction from the controller 212. The battery 211 informs the controller 212 of its rated voltage, charge-discharge maximum currents, state of charge (SOC), and state of health (SOH).

The controller 212 also has power converting unit functions, and is also called an inverter, a converter, or a PCS (power conditioning system). The controller 212 performs, as power converting unit functions, determination of input/output power values, determination of voltages, DC/AC conversion, and suppression of voltage variation.

With a communication function, the controller 212 communicates with an EMS 230 (corresponds to the EMS 111 shown in FIG. 1) which is installed in the power system network. The controller 212 communicates such information as an SOC and an SOH of the battery 211 to the EMS 230. In general, self-discharge occurs in batteries. Collecting such information as an SOC and an SOH of the battery 211 from the battery energy storage system 210, the EMS 230 can properly monitor the state of the battery 211 which varies every moment and give charge-discharge control instructions to the battery energy storage system 210.

In the embodiment, the whole of various kinds of power input and output that are done through the controller 212 is considered charge-discharge control. That is, various kinds of power including, in addition to power relating to the battery 211, natural power such as wind power and solar power and power that is exchanged with the power system network are input and output through the controller 212. In each power system which is a set of power converting units, each power converting unit switches the input or output power. The controller 212 may be implemented on an external processor that is connected to the battery energy storage system 210.

The battery (BMU) 211 and the controller (power converting unit) 212 are connected to each other by a CAN (controller area network). The charge-discharge control and the information notification which are done between the battery 211 and the controller 212 are realized using the CAN. Instead of the CAN, a wired communication medium such as an Ethernet (registered trademark), a wireless communication medium such as a LAN (local area network), or an electric signal line that is defined independently by a vendor of a product.

The EV system 240 is similar in configuration to the battery energy storage system 210, and is different from the latter in that part of the functions of the controller 212 of the battery energy storage system 210 are transferred to an external charger 250 which is connected to the EV system 240. That is, when connected to the charger 250, the EV system 240 serves as a battery energy storage system 210a which corresponds to the battery energy storage system 210.

A controller 242 of the EV system 240 relays a charging control and information notification between a battery (BMU) 241 and the charger (power converting unit) 250. In the configuration shown in FIG. 2(b), two power converting units are provided in the controller 242 and the charger 250, respectively. For example, the two power converting units may perform different functions in such a manner that the power converting unit that is connected to the power system network (i.e., the power converting unit provided in the charger 250) performs DC/AC conversion and the power converting unit that is connected to the internal battery 241 or a natural energy power generation facility (i.e., the power converting unit provided in the controller 242) performs DC/DC conversion. The controller 242 of the EV system 240 may be given the same functions as the controller 212 of the battery energy storage system 210. Pieces of algorithm-based processing relating to charging and discharge of the battery 241 may be performed in any of plural forms; for example, they may be performed in a concentrated manner by any of the controller 242, the charger 250, the user-side EMS 270, the EMS of the power system network, etc.

The embodiment is directed to a case that plural main control apparatus control plural battery energy storage systems. Examples in which plural main control apparatus control plural battery energy storage systems and which correspond to the system-side battery network and the user-side battery network shown in FIG. 1 will be described with reference to FIGS. 3 and 4, respectively.

Figure 3:
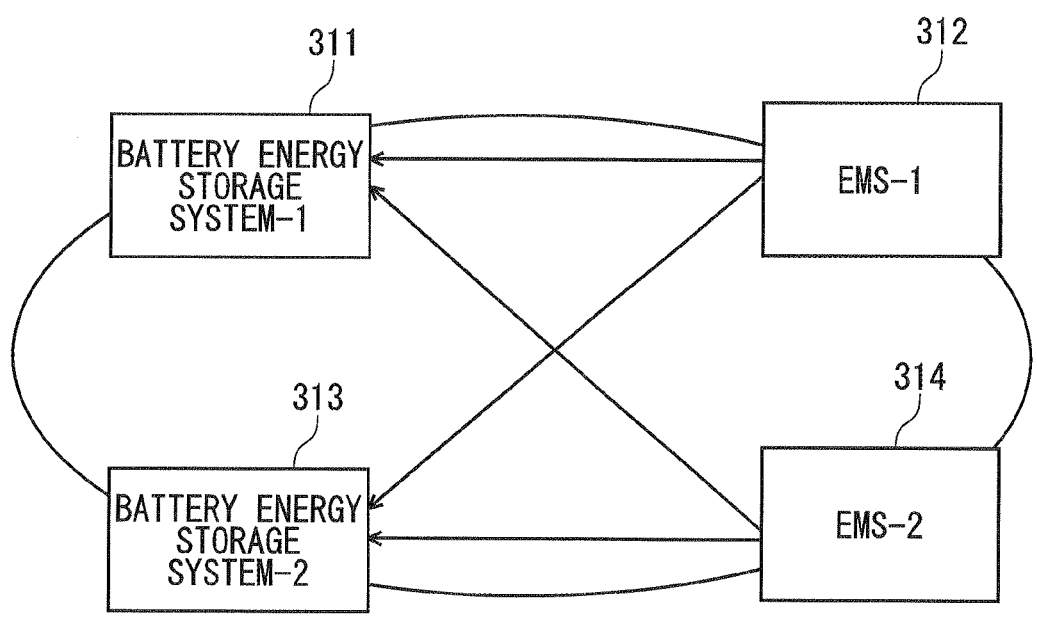
FIG. 3 shows an example configuration of a system-side battery network.

FIG. 3 shows an example system-side battery network in which plural main control apparatus control plural battery energy storage systems and which corresponds to the system-side battery network shown in FIG. 1.

As mentioned above, on the power system network side, to cope with an instantaneous load variation, a battery energy storage system has the function called the ancillary service. To realize the ancillary service function, the battery energy storage system needs to have a storage capacity that is so large as to be equivalent to the storage capacity of a power plant. One promising measure for securing such a large storage capacity is to use plural battery energy storage systems (in FIG. 3, battery energy storage system-1 311 and battery energy storage system-2 313) which are connected to each other. The battery energy storage system-1 311 and the battery energy storage system-2 313 correspond to the battery energy storage system 113 shown in FIG. 1.

On the other hand, where battery energy storage systems to be controlled are distributed in plural regions, it is desirable to prepare plural EMSs (in FIG. 3, EMS-1 312 and EMS-2 314) in the respective regions as main control apparatus for controlling the battery energy storage systems. The EMS-1 312 and EMS-2 314 correspond to the EMS 111 shown in FIG. 1.

As described above, one promising method for constructing a large-scale system on the power system network side is to form a system by connecting plural battery energy storage systems (in FIG. 3, battery energy storage system-1 311 and battery energy storage system-2 313) to plural EMSs (in FIG. 3, EMS-1 312 and EMS-2 314). In this case, since there are the plural main control apparatus for controlling the plural battery energy storage systems, it is preferable in terms of communication efficiency to group the battery energy storage systems and control them on a group-by-group basis.

Figure 4:
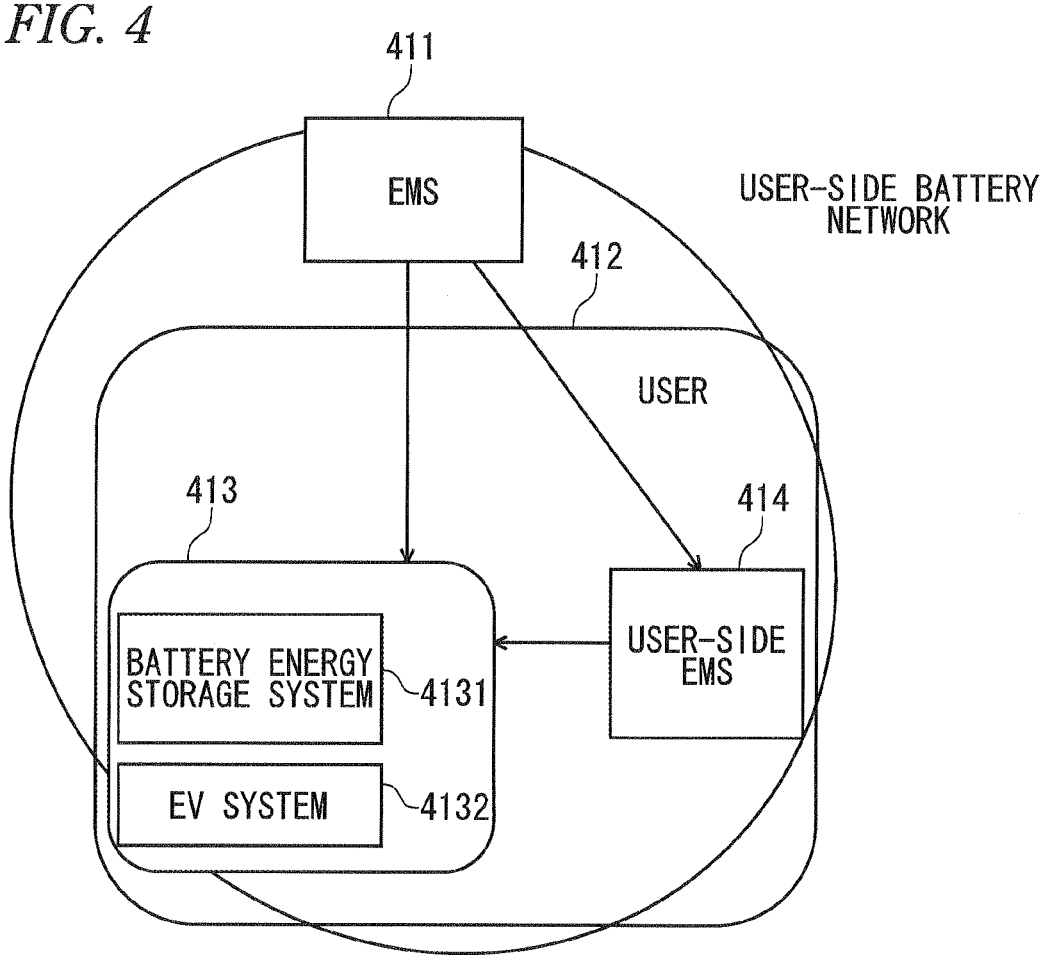
FIG. 4 shows an example configuration of a user-side battery network.

FIG. 4 shows an example user-side battery network in which plural main control apparatus control plural battery energy storage systems and which corresponds to the user-side battery network shown in FIG. 1. More specifically, in this example, an EMS 411 (corresponds to the EMS 111 shown in FIG. 1) and a user-side EMS 414 (corresponds to the user-side EMS 122 shown in FIG. 1) control a battery energy storage system 4131 (corresponds to the battery energy storage system 1232 shown in FIG. 1) and an EV system 4132 (corresponds to the EV system 1233 shown in FIG. 1). Since as described above the EV system 4132 is given the same functions as a battery energy storage system when connected to a charger (250), the EV system 4132 is called a battery energy storage system 4131a when connected to a charger (250).

As described above, on the user side, in general, battery energy storage systems are given the peak shift function of storing nighttime electric energy which is low in cost and supplying it in a daytime time slot in which power demands are concentrated. In addition, an operation form may be employed in which a power company performs charge-discharge controls on battery energy storage systems that are installed on the user side on condition that the user side is given a certain incentive. Therefore, in the user-side battery network shown in FIG. 4 in which both of the EMS 411 and the user-side EMS 414 access the electric energy stored in the battery energy storage systems 4131 and 4131a to use them in a shared manner, it is a promising measure to form a system by connecting the battery energy storage systems 4131 and 4131a to the EMS 411 and the user-side EMS 414. In this case, since there are plural main control systems for controlling the battery energy storage systems 4131 and 4131a, a contention of charge-discharge controls may occur. Therefore, as in the example of FIG. 3, it is preferable to group the battery energy storage systems and control them on a group-by-group basis and thereby secure safety, maintain the throughput, and solve such problems as an insufficient communication bandwidth.

Figure 5:
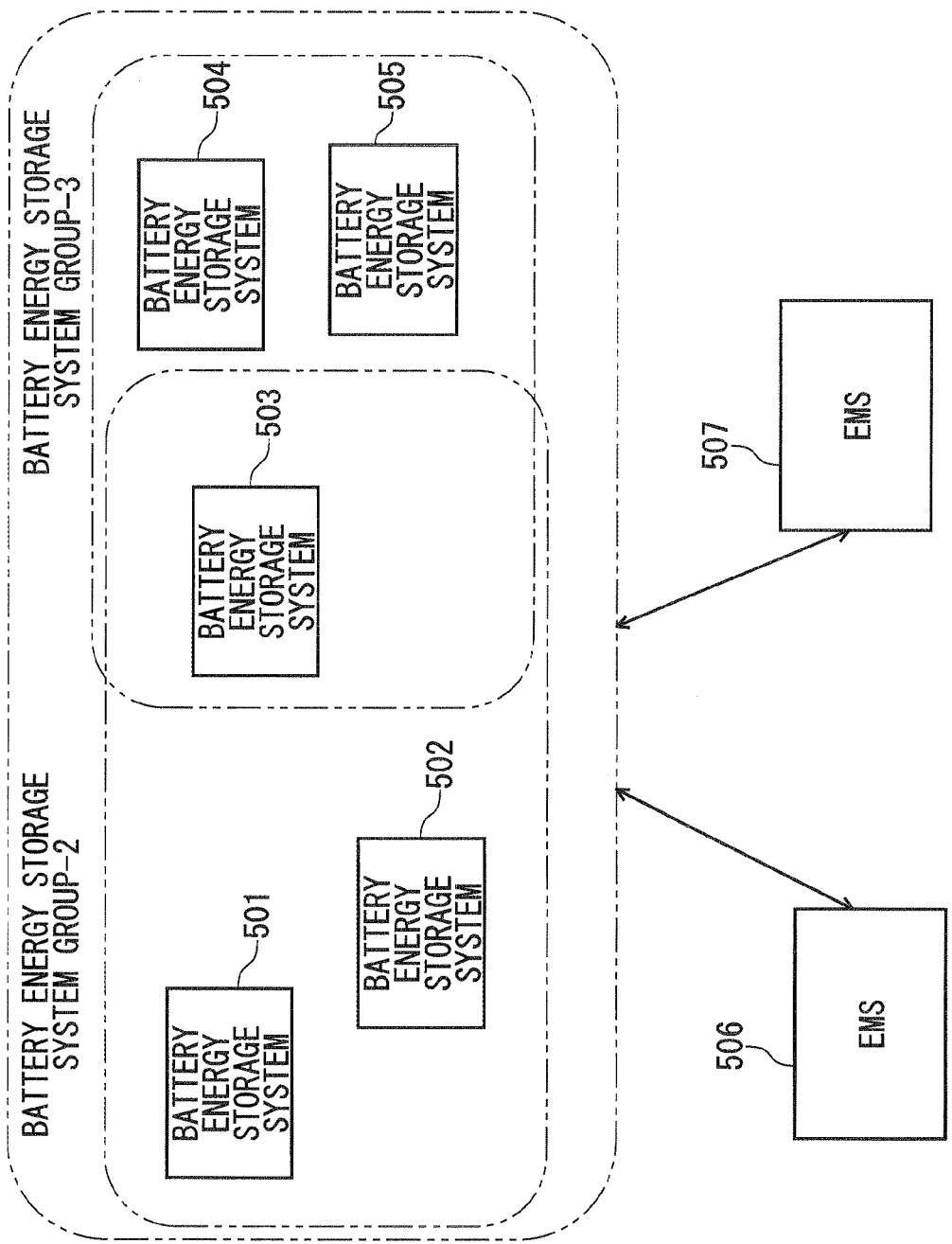
FIG. 5 is a conceptual diagram illustrating logical grouping of plural battery energy storage systems in the embodiment.

FIG. 5 shows a concept that plural battery energy storage systems are grouped and each group of battery energy storage systems is dealt with as a single logical battery energy storage system. A means for grouping is divided into a group forming means for forming groups so that each group of battery energy storage systems is dealt with as a single logical battery energy storage system and an information transmitting means which works after the formation of groups. The embodiment is particularly directed to the group forming means.

Where each group (set) of battery energy storage systems is dealt with as a single logical battery energy storage system and plural battery users are given a joint use right to use it, the group forming means can be realized by several methods, examples of which are a method in which virtual set formation (logical grouping) is done on the EMS side after measurement information and control information are exchanged through communications with individual battery energy storage systems and a method in which virtual set formation (logical grouping) is done in a fixed manner charge-discharge roles are assigned to respective battery energy storage systems.

However, the former method has a problem that the bandwidth for communications between the EMSs and the battery energy storage systems become insufficient because information transmission is performed individually. In the latter method, it is difficult to change the roles of the battery energy storage systems in a flexible manner. Furthermore, depending on the procedure for assigning roles in a fixed manner, battery energy storage systems that are charged and battery energy storage systems that discharge are mixed in a group of battery energy storage systems, which causes each EMS to perform information transmissions individually. This results in an insufficient communication bandwidth, the same problem as of the former method.

Figure 6:
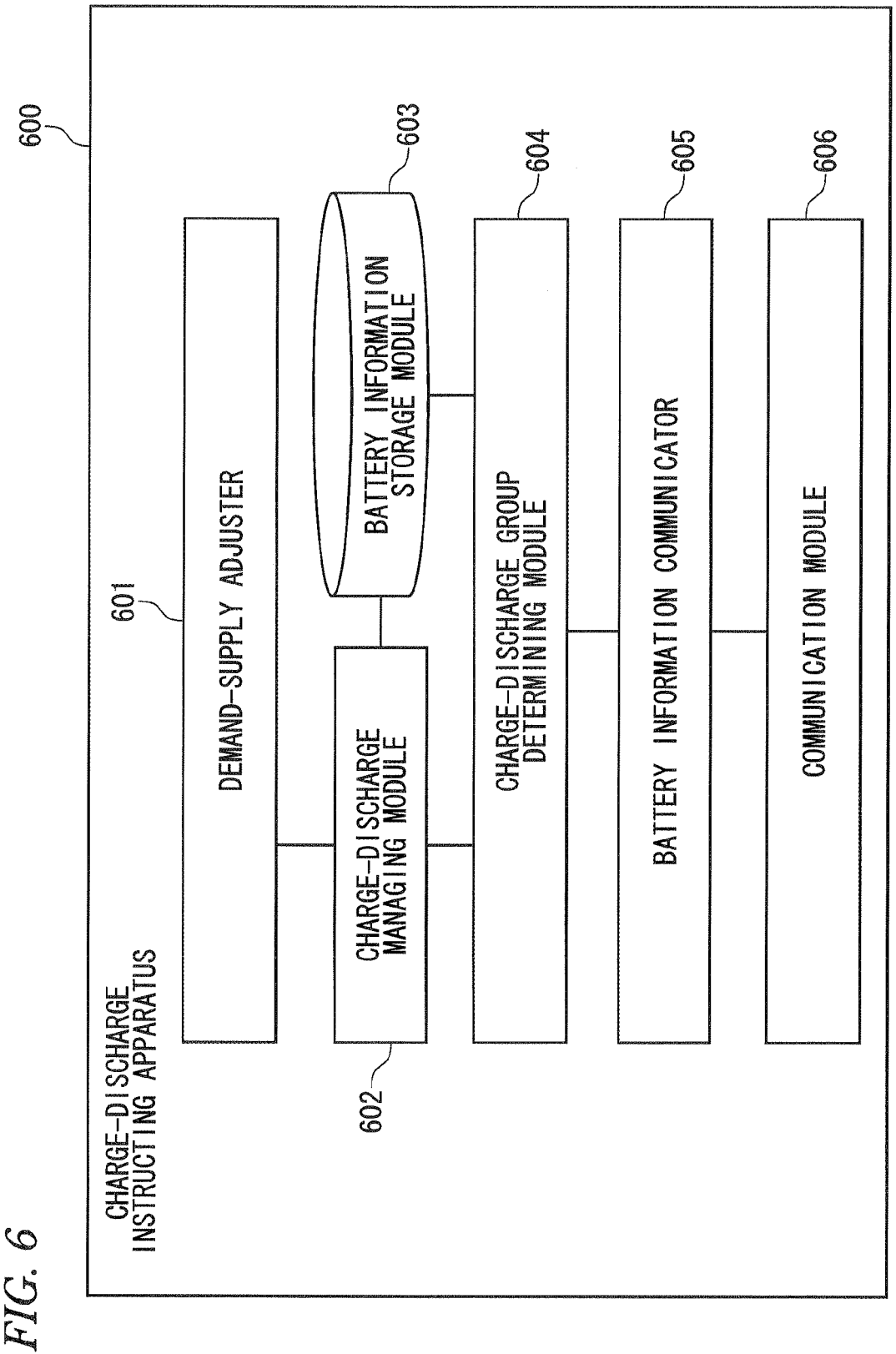
FIG. 6 is a block diagram showing the configuration of a charge-discharge instructing apparatus 600 according to the embodiment.
Figure 16:
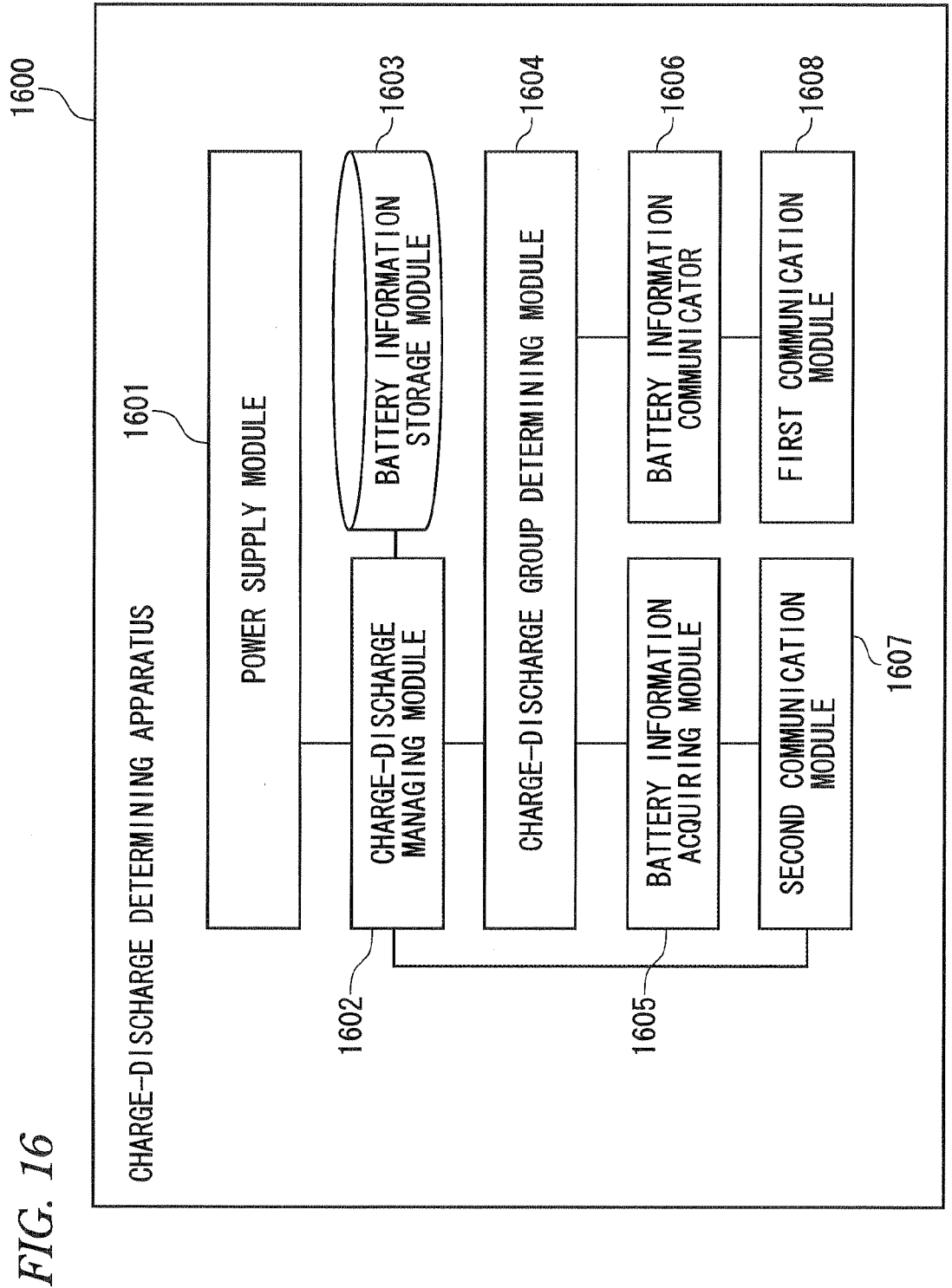
FIG. 16 is a block diagram showing the configuration of a charge-discharge determining apparatus 1600 according to the embodiment.

A charge-discharge instructing apparatus 600 according to the embodiment which can increase the communication efficiency will be described below. FIG. 6 is a block diagram of the charge-discharge instructing apparatus 600 according to the embodiment. FIG. 16 is a block diagram of a charge-discharge determining apparatus 1600 according to the embodiment.

In FIG. 1, each of the EMS 111 on the side of the power system network or the user-side EMS 122 which is installed in the facilities of the user 120 has the functions of the charge-discharge instructing apparatus 600. Where a relay apparatus exists between the EMS 111 and the user-side EMS 122 in FIG. 1, the relay apparatus may have the functions of the charge-discharge instructing apparatus 600. A relay apparatus will be described later.

The controller 212 of the battery energy storage system 210 shown in FIG. 2(a) or the charger 250 which is installed outside the EV system 240 shown in FIG. 2(b) has the functions of the charge-discharge determining apparatus 1600. The charge-discharge determining apparatus 1600 can be applied to a solar power generator or a wind power generator. The charge-discharge determining apparatus 1600 sends information relating to the battery energy storage system where it is installed to the charge-discharge instructing apparatus 600. Receiving pieces of information relating to plural battery energy storage systems, the charge-discharge instructing apparatus 600 groups those battery energy storage systems. The application range of the charge-discharge determining apparatus 1600 is not limited to PCSs, and it can also be applied to external controllers which have a communication processing unit and can communicate with a charge-discharge instructing apparatus and a battery.

As shown in FIG. 6, the charge-discharge instructing apparatus 600 is equipped with a demand-supply adjuster 601, a charge-discharge managing module 602, a battery information storage module 603, a charge-discharge group determining module 604, a battery information communicator 605, and a communication module 606.

The demand-supply adjuster 601 monitors a power supply amount and a frequency state in the power system network of a power company or user facilities. Furthermore, the demand-supply adjuster 601 judges whether or not it is necessary to, for example, give a discharge control instruction to a battery energy storage system to prevent a blackout due to a power supply shortage or to give a charging control instruction to a battery energy storage system for later use of surplus power that results from excessive supply of power, and gives such an instruction as appropriate. The demand-supply adjuster 601 has a role of an application processing unit.

The battery information storage module 603 stores battery specific information, location information, and charge-discharge control information which are necessary in a charge-discharge control of a battery energy storage system. FIG. 7A(a)-7A(c) show examples of battery specific information, location information, and charge-discharge control information, respectively, used in the embodiment.

As shown in FIG. 7A(a), the battery specific information is pieces of information that indicate electrical characteristics specific to a battery unit (BMU) and is necessary for a charge-discharge control. In the example of FIG. 7A(a), the battery specific information includes rated charge-discharge power (W), a rated capacity (W·h), a state of charge (SOC; %), and a dischargeable time and a chargeable time which are correlated with the SOC. In the case of the constant current charging method which is a common charging method of batteries, the input/output power (current) of the battery cells of a battery unit (BMU) is kept constant until the SOC (%) reaches a prescribed threshold value. Therefore, as shown in a graph of FIG. 7A(b), by acquiring an SOC value from the battery unit, the charge-discharge determining apparatus 1600 can calculate a corresponding chargeable time and dischargeable time (on the horizontal axis of the graph), a maximum charge-discharge power (vertical axis of the graph), electric energy values necessary for charging and discharge (products of the power and the chargeable time and the dischargeable time). The constant current charging method has a feature that the current that is necessary for charging is minimized after the SOC has exceeded the prescribed threshold value. In charge-discharge controls, another parameter "current hour" (A·h) or "voltage hour" (V·h) may be used instead of the parameter "electric energy" (W·h).

The location information shown in FIG. 7A(c) is used for determining an installation position of a battery energy storage system (or a user-side EMS for managing a battery energy storage system). For example, the location information includes identifier information of a facility (in FIG. 1, user 120) where a battery energy storage system is installed, identifier information of a power distribution network that is located at the installation position of the battery energy storage system, and identifier information of a communications network that is located at the installation position of the battery energy storage system.

Figure 7B:
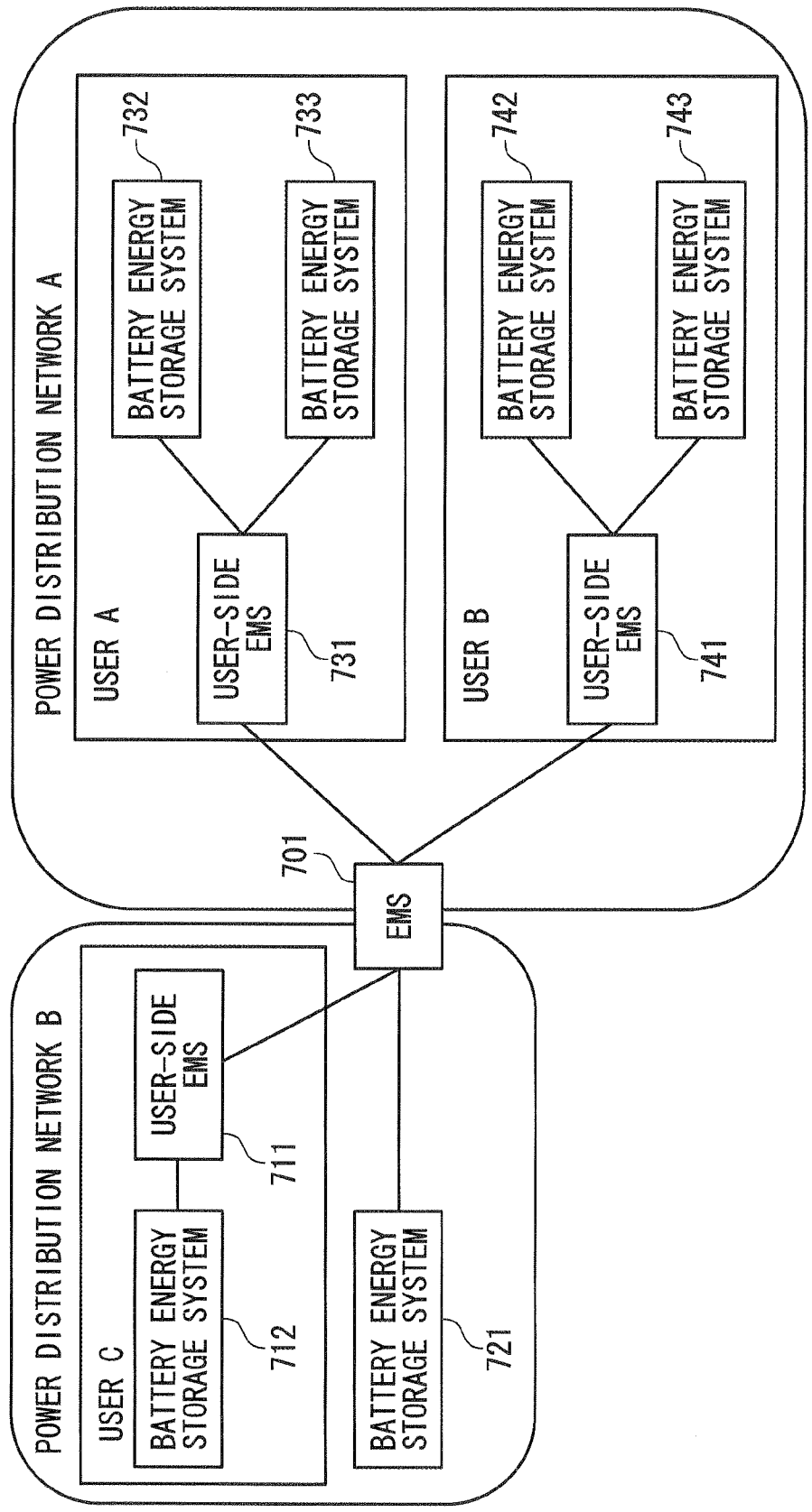
FIG. 7B illustrates a relationship between battery energy storage systems and pieces of location information in the embodiment.
Figure 7C:
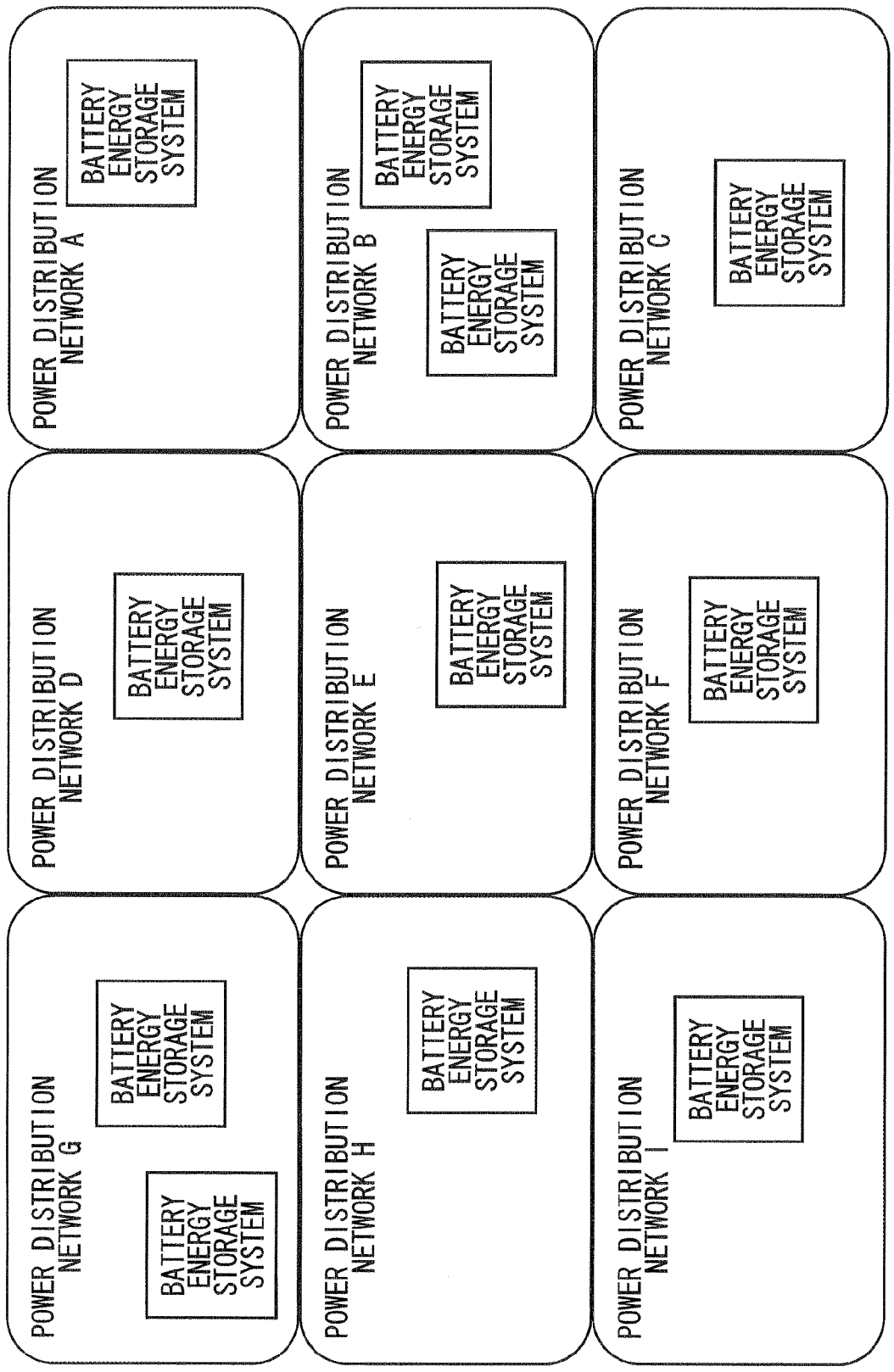
FIG. 7C shows an arrangement example in which nine power distribution networks exist.

FIG. 7B illustrates a relationship between battery energy storage systems and pieces of location information in the embodiment. Each of the battery energy storage systems shown in FIG. 7B corresponds to the battery energy storage system 113, the battery energy storage system 1232, or the EV system 1233 shown in FIG. 1. Battery energy storage systems 732, 733, 742, and 743 shown in FIG. 7B are assigned an identifier of a power distribution network A as power distribution network identifier information. Battery energy storage systems 712 and 721 are assigned an identifier of a power distribution network B. The battery energy storage systems 732 and 733 are assigned an identifier of a user A as a facility identifier. The battery energy storage systems 742 and 743 are assigned an identifier of a user B as a facility identifier. The battery energy storage system 712 is assigned an identifier of a user C as a facility identifier. Each of the battery energy storage systems 712, 721, 732, 733, 742, and 743 is assigned, as a communications network identifier, its own communications network address (e.g., IP address). Although FIG. 7B shows the example in which two power distribution networks exist, there would be cases in which three or more power distribution networks exist. FIG. 7C shows an arrangement example in which nine power distribution networks A-I exist. A battery energy storage system(s)

installed in each of the power distribution networks A-I is assigned an identifier of the corresponding power distribution network.

The charge-discharge control information shown in FIG. 7A(d) is used for recognizing a charge-discharge operation state of a battery energy storage system. For example, when a battery energy storage system is to be controlled in real time to prevent an instantaneous power failure in a power network, it is desirable that the charge-discharge instructing apparatus 600 perform an on-demand operation in which it sends or receives a communication message relating to a charge-discharge control instruction when necessary. On the other hand, when battery energy storage systems are to be controlled at relatively long intervals in a nighttime time slot, it is desirable that the charge-discharge instructing apparatus 600 perform a planned operation in which an operation timing schedule of charge-discharge controls is set. In an item "charge-discharge control" of the charge-discharge control information shown in FIG. 7A(d), "set/not set" indicates whether schedule information for a planned operation is set or not set. The pieces of information shown in FIGS. 7A(a), 7A(c), and 7A(d) which are stored in the battery information storage module 603 can be changed if necessary according to an application site; for example, only part of these pieces of information may be used and information of a communication protocol type to be used for authentication may be added.

The charge-discharge group determining module 604 selects, as a group, some battery energy storage systems from plural battery energy storage systems on the basis of pieces of battery specific information and pieces of location information and performs charge-discharge controls on the battery energy storage systems belonging to the selected group. A detailed battery energy storage systems grouping procedure that is followed by the charge-discharge group determining module 604 will be described later with reference to a flowchart of FIG. 14. The charge-discharge group determining module 604 manages resulting groups of battery energy storage systems. FIG. 8A shows an example method of management of groups of battery energy storage systems. The charge-discharge group determining module 604 manages groups of battery energy storage systems by storing information indicating each battery energy storage system group and pieces of information indicating battery energy storage systems belonging to the group in such a manner that they are correlated with each other. In the example of FIG. 8A, for example, the charge-discharge group determining module 604 stores pieces of information indicating battery energy storage systems A and B in such a manner that they are correlated with a battery energy storage system group (1).

The charge-discharge managing module 602 manages total amounts of charge-discharge power of the groups (virtual sets) of battery energy storage systems (formed by the charge-discharge group determining module 604) and gives charge-discharge control instructions to the groups of battery energy storage systems.

First, a description will be made of charge-discharge control instructions which are given to groups of battery energy storage systems. The charge-discharge managing module 602 gives charging or discharge control instructions to the respective groups of battery energy storage systems using the pieces of information relating to them managed by the charge-discharge group determining module 604 while monitoring a demand-supply adjustment state.

The charge-discharge managing module 602 issues charge-discharge control instructions on a group-by-group basis using the battery group management information shown in FIG. 8A. More specifically, the charge-discharge managing module 602 sends a charge-discharge instruction message(s) as shown in FIG. 8B to the battery energy storage systems that belong to a battery energy storage system group via the battery information communicator 605. As shown in FIG. 8B, a charge-discharge instruction message contains a TCP/IP (transmission control protocol/Internet protocol) communication header, an identifier for identification of the message content, the number of battery energy storage systems, and identifiers for identification of the battery energy storage systems.

Figure 8C:
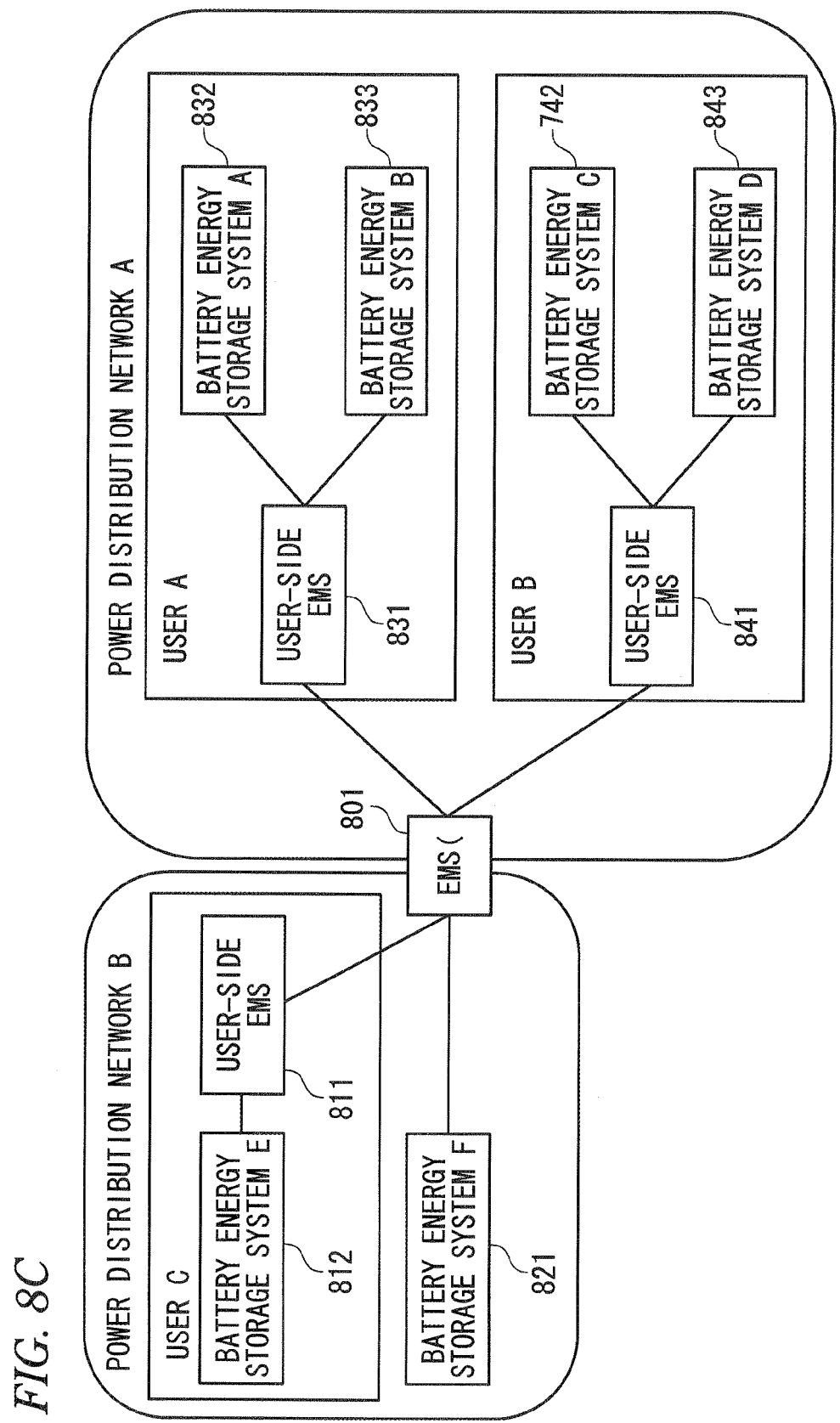
FIG. 8C shows a system in which the battery energy storage system groups of FIG. 8A are formed.

The structure of a charge-discharge instruction message shown in FIG. 8B will be described for a case that battery energy storage system groups are formed as shown in FIG. 8A in a system shown in FIG. 8C. The following description will be directed to battery energy storage system group-1 among the battery energy storage system groups shown in FIG. 8A. The header of the message structure shown in FIG. 8B contains an identifier for identification of a user-side EMS. Therefore, two messages as shown in FIG. 8B are generated which are directed to user-side EMSs 831 and 841, respectively. The message that is directed to the user-side EMS 831 contains two identifiers of the respective battery energy storage systems A and B and a number "2." The message that is directed to the user-side EMS 841 contains one identifier of the battery energy storage system C and a number "1."

As described above, the charge-discharge group determining module 604 stores information indicating each battery energy storage system group and pieces of information indicating battery energy storage systems belonging to the group in such a manner that they are correlated with each other and the charge-discharge managing module 602 sends charge-discharge control instruction messages to the groups of battery energy storage systems. Thus, charge-discharge control instructions can be given to the groups of battery energy storage systems.

A charge-discharge control instruction contains, in addition to the contents of the message shown in FIG. 8B, a specified amount of charge-discharge power (for a battery energy storage system that performs an on-demand operation) or a specified amount of charge-discharge power and a specified time interval (for a battery energy storage system that performs a planned operation).

To send such a control instruction as a communication message, it is preferable that the battery information communicator 605 employ, for respective application sites, different data models/communication protocols such as IEC 61850 which is a power infrastructure standard for control of distribution type power sources, BACnet which is a standard for buildings, ECHONET for Japanese homes, and ZigBee SEP (smart energy profile) 2 for European holes so that a charge-discharge control is performed according to specifications of each standard. However, the charge-discharge instructing apparatus 600 according to the embodiment is not required to employ specification items of a particular protocol.

A charge-discharge control instruction message is sent to the charge-discharge determining apparatus 1600 (described later). Safety can be enhanced by adding an authentication procedure in a procedure of communication between the charge-discharge determining apparatus 1600 and the charge-discharge instructing apparatus 600. The description of the charge-discharge control instruction ends here.

Figure 8D:
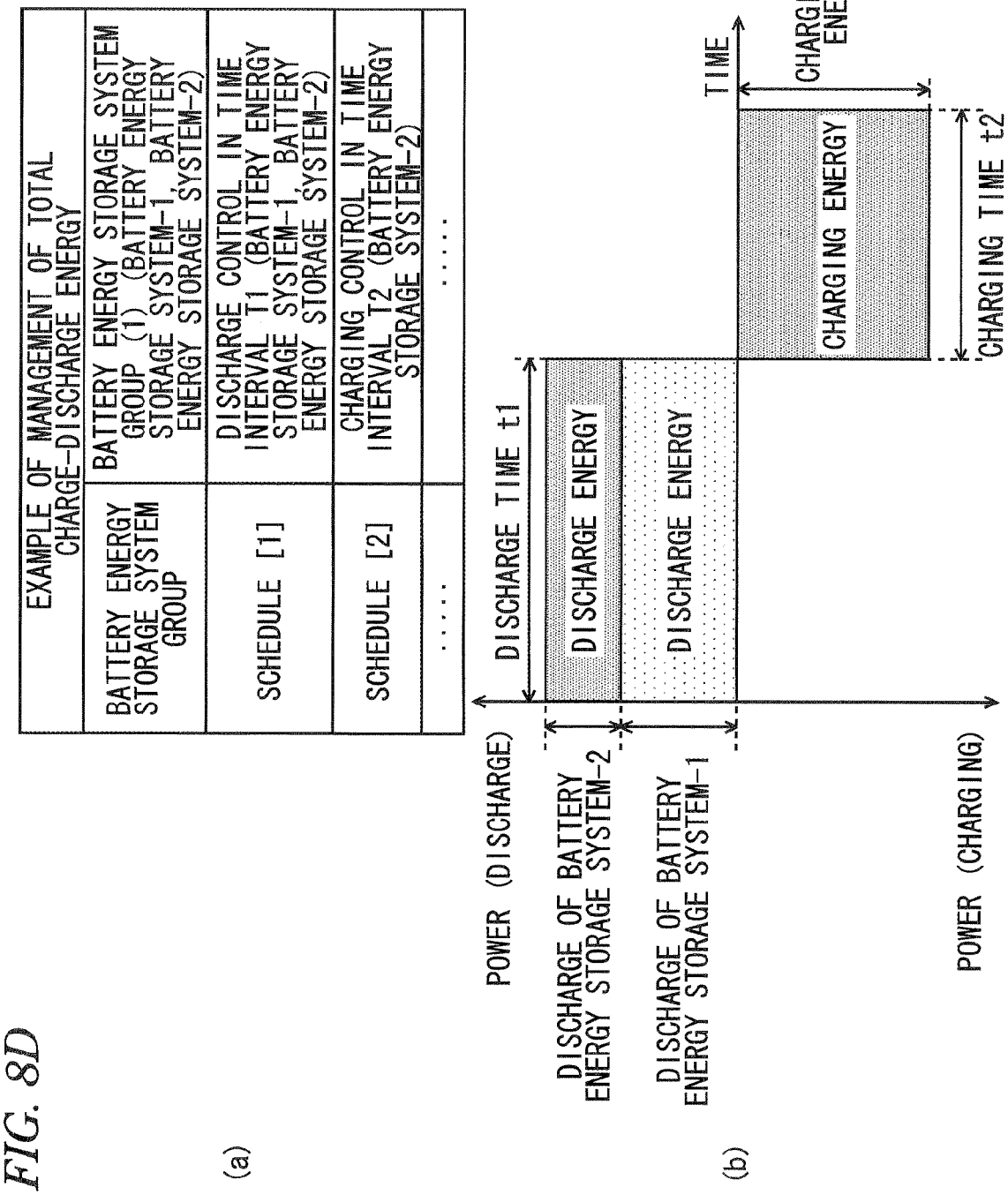
FIG. 8D shows an example of management of a total amount of charge-discharge power.

Next, the management of a total amount of charge-discharge power will be described. FIG. 8D(a) shows an example of management of a total amount of charge-discharge power. It is assumed that as shown in FIG. 8D(a) two battery energy storage systems (battery energy storage system-1 and battery energy storage system-2) belong to a battery energy storage system group (1). If battery energy storage system-1 discharges at 100 W and battery energy storage system-2 discharges at 200 W during a time interval $t_1$, the total amount of charge-discharge power is 300 W (discharge) in this time interval. That is, the total amount of charge-discharge power means a total amount of charging power or a total amount of discharge power of battery energy storage systems belonging to a battery energy storage system group (in each time interval if the total amount varies depending on the time interval). The management of a total amount of charge-discharge power means calculation of a total amount of charging power or a total amount of discharge power of battery energy storage systems belonging to each battery energy storage system group. As described later in the description of a control example shown in FIG. 10, in the case where the charge-discharge instructing apparatus 600 is a relay apparatus, the charge-discharge instructing apparatus 600 may communicate a total amount of charge-discharge power of each battery energy storage system group to an EMS in response to an inquiry from the EMS.

The battery information communicator 605 operates when the charge-discharge instructing apparatus 600 acquires, from the charge-discharge determining apparatus 1600, via the communication module 606, a communication message to be used for recognizing pieces of power information of batteries (BMUs) and a manner of grouping which are necessary for a charge-discharge control. Such a communication message will be described later in detail. Pieces of power information of batteries (BMUs) and a manner of grouping (more specifically, for example, pieces of battery specific information and location information) which are necessary for a charge-discharge control can be acquired without using the battery information communicator 605 or the communication module 606 (described below). For example, the charge-discharge instructing apparatus 600 may be equipped with, as a means for acquiring pieces of battery specific information and location information, a means for acquiring such pieces of information in the form of information that is input by a user by manual setting or a means for acquiring such pieces of information by reading information from an information storage medium. That is, pieces of battery specific information and location information can be acquired without using a communications network. A means for pieces of battery specific information and location information may be called an acquiring means.

The communication module 606 can be realized by using a wired communication medium such as an optical fiber, a telephone line, or an Ethernet (registered trademark) or a wireless communication medium. However, in the embodiment, the communication module 606 does not rely on a particular communication medium.

Figure 10:
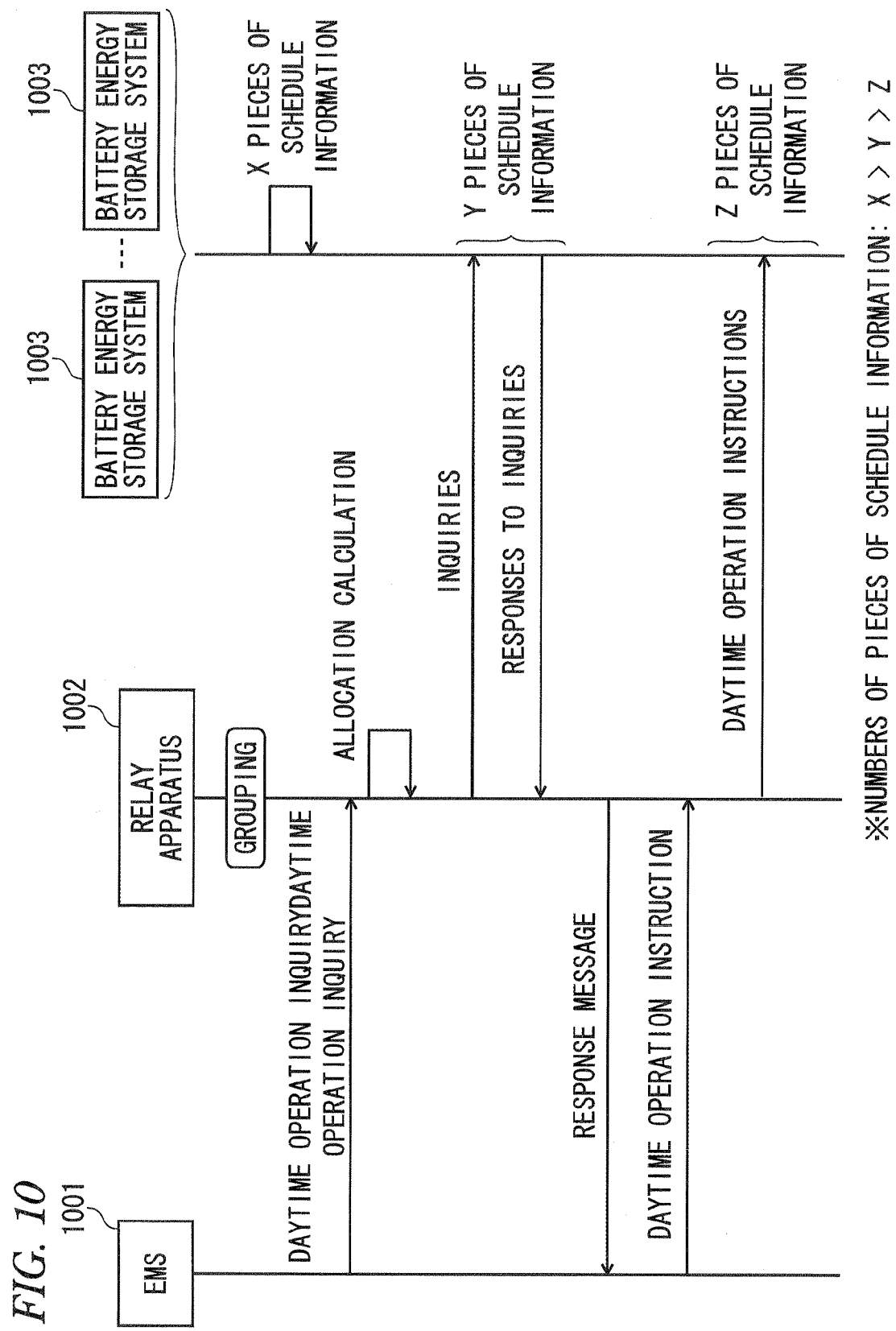
FIG. 10 is an operation sequence diagram of daytime operation control of the charge-discharge instructing apparatus 600.

Next, an example operation procedure of the charge-discharge instructing apparatus 600 will be described with reference to FIGS. 9 and 10. FIG. 9 shows an operation sequence which relates to short cycle control for stabilizing a system by performing output adjustments in order of seconds in response to instantaneous load variations to maintain necessary quality of electricity such as the frequency and the voltage of the system. On the other hand, FIG. 10 shows an operation sequence which relates to daytime operation control of storing nighttime electric energy which is low in cost and supplying it in a daytime time slot in which power demands are concentrated (for users such as homes and buildings).

Each of an EMS 901 and a relay apparatus 902 shown in FIG. 9 corresponds to the charge-discharge instructing apparatus 600. More specifically, the example of FIG. 9 is directed to a case that the EMS 111 shown in FIG. 1 is divided into the EMS 901 and the relay apparatus 902.

The relay apparatus 902 groups plural battery energy storage systems (or user-side EMSs) 903 and manages them so that they look like a single logical battery energy storage system. The EMS 901 performs a rough supervisory control by regarding the relay apparatus 902 as a single logical set. The relay apparatus 902 is generally called a SCADA (supervisory control and data acquisition). A SCADA relating to batteries is also called a battery SCADA.

Assume that in the example of FIG. 9 N battery energy storage systems 903 are put under the control of the relay apparatus 902. In this case, the relay apparatus (SCADA) 902 acquires such information as a rated capacity and rated output power of each of the N battery energy storage systems 903. Then, the relay apparatus 902 executes a grouping process of virtually unifying the N battery energy storage systems 903 into one logical battery energy storage system. The relay apparatus 902 presents, to the EMS 901, information of the group of battery energy storage systems 903 in the form of a short cycle capacity (total amount of power). In addition to the short cycle capacity, the relay apparatus 902 presents a total amount of instantaneous charging or discharge output power in a real-time control. Receiving these unified pieces of information, the EMS 901 monitors the demand-supply status of the system and, if necessary, communicates a short cycle instruction value to the relay apparatus 902. Although in the example of FIG. 9 the only one EMS 901 and relay apparatus 902 exist, plural EMSs and plural relay apparatus may cooperate. According to instructions from the EMS 901, the relay apparatus 902 exchanges communication messages relating to control and measurement with the N battery energy storage systems 903 (or user-side EMSs which manage the N battery energy storage systems 903) under its management. In the example of FIG. 9, the relay apparatus 902 communicates an effective power output instruction value to the N battery energy storage systems 903 as control information. Then, the relay apparatus 902 receives effective power current values, chargeable energy values, and dischargeable energy values as measurement values.

As in the example of FIG. 9, an EMS 1001 and a relay apparatus 1002 for daytime operation control are a detailed version of the EMS 111 shown in FIG. 1 and its neighborhood. More specifically, the example of FIG. 10 is directed to a case that the EMS 111 which is installed in a power facility is divided into the EMS 1001 and the relay apparatus 1002. The relay apparatus 1002 groups plural battery energy storage systems (or user-side EMSs) 1003 and manages them so that they look like a single virtual battery energy storage system. The EMS 1001 performs a rough supervisory control by regarding the relay apparatus 1002 as a single logical set.

Assume that in the example of FIG. 10 X battery energy storage systems 10903 are put under the control of the relay apparatus 1002. In this case, pieces of charge-discharge schedules are set for the X respective battery energy storage systems 1003. In making a one-day power allocation plan (daytime operation) of each region, the EMS 1001 judges what power can be supplied from the battery energy storage system group. To this end, the EMS 1001 inquires of the relay apparatus 1002 about a daytime operation and the relay apparatus 1002 inquires of each battery energy storage system 1003 under its control about a specific schedule. As shown in FIG. 10, only Y (Y<X) battery energy storage systems 1003 (or user-side EMSs that manage battery energy storage systems 1003) that want to answer the inquiry may return schedule information to the relay apparatus 1002. The relay apparatus 1002 collects the received pieces of schedule information and stores information indicating a manner of management of a total amount of charge-discharge power as shown in FIG. 8D(a). More specifically, the relay apparatus 1002 returns a response message to the daytime operation inquiry received from the EMS 1001 based on the fact that power that can be used by the power infrastructure side is equal to the difference between the rated power of each battery energy storage system 1003 (installed on the user side) and power that is used by a user-side EMS (HEMS, BEMS, or the like). Then, the EMS 1001 instructs the relay apparatus 1002 about a daytime operation charge-discharge schedule and the relay apparatus 1002 gives control instructions to the respective battery energy storage systems 1003. The relay apparatus 1002 may communicate schedule information to only Z (Z<Y) battery energy storage systems 1003 as a result of a calculation of power allocation values done in the relay apparatus 1002. In this manner, the amount of communication between the relay apparatus 1002 and the battery energy storage systems 1003 can be reduced by reflecting, in the control of the battery energy storage systems 1003, a result of a calculation that is performed according to a daytime operation judgment algorithm.

Figure 11:
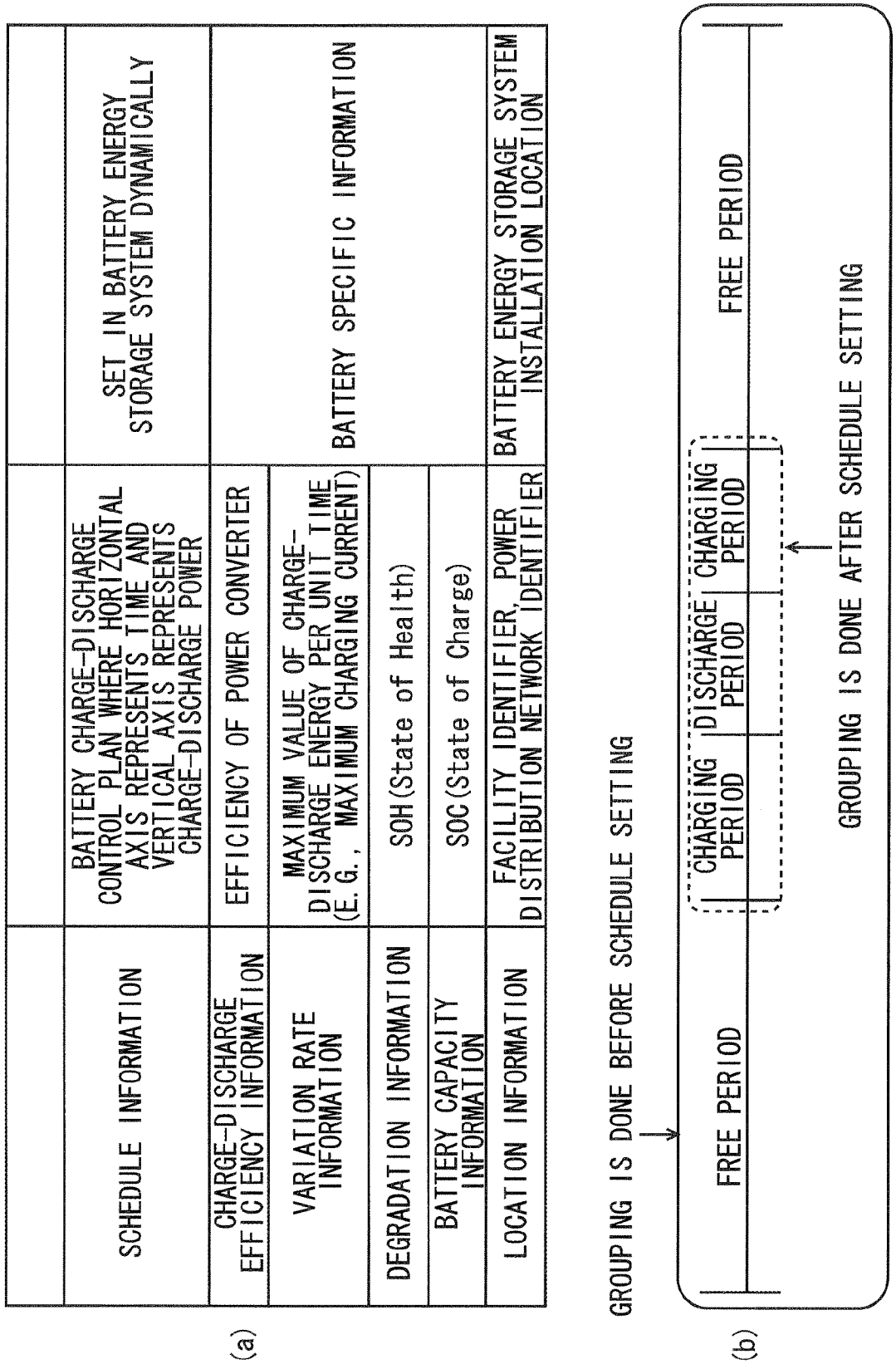
FIG. 11 shows various kinds of information that the charge-discharge instructing apparatus (relay apparatus) 600 can use in grouping battery energy storage systems.
Figure 12:
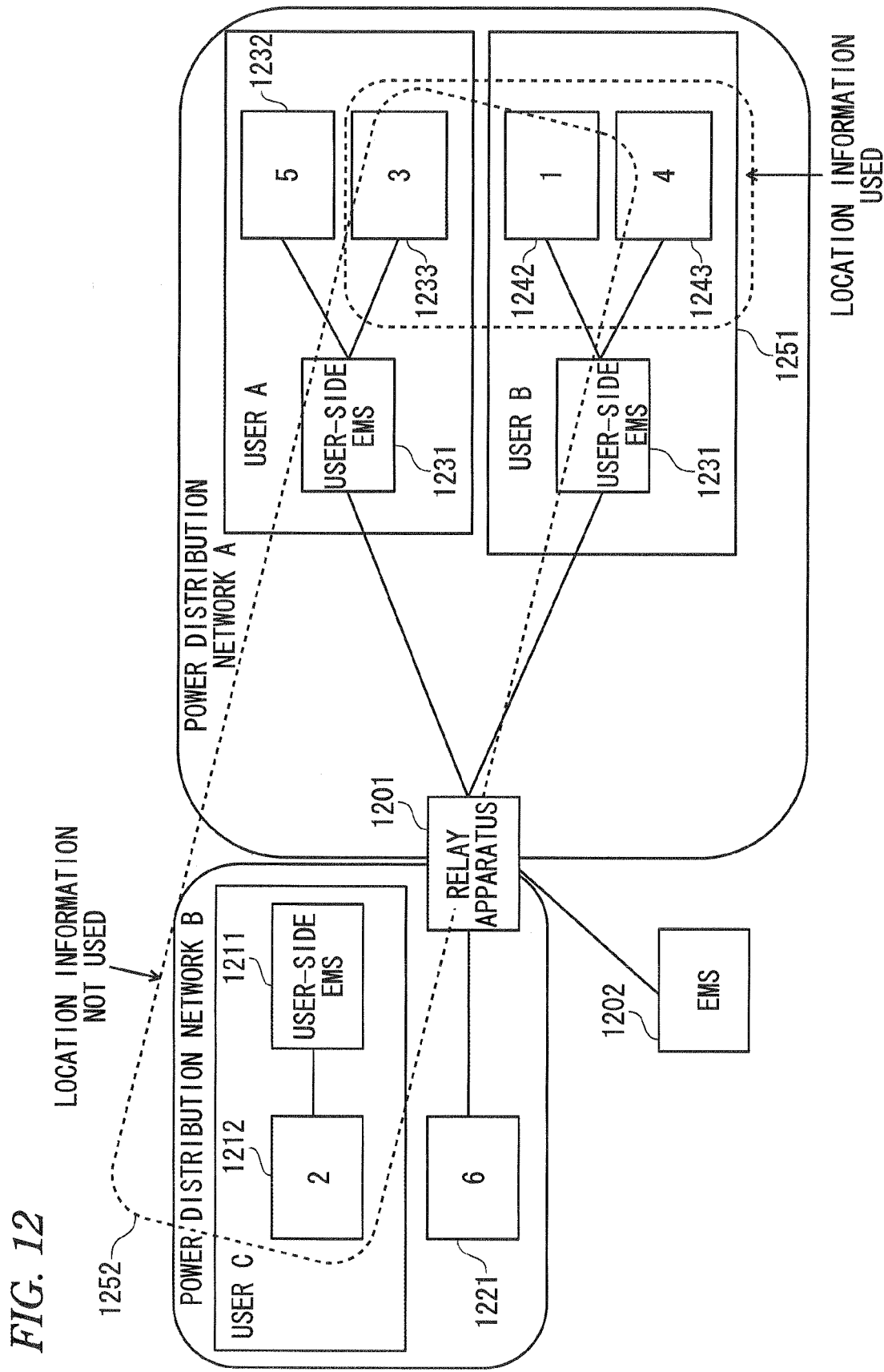
FIG. 12 shows examples of grouping of battery energy storage systems done by the charge-discharge instructing apparatus (relay apparatus) 600.

FIGS. 11 and 12 summarize problems that relate to implementation of the charge-discharge instructing apparatus 600. FIG. 11(a) shows various kinds of information that the charge-discharge instructing apparatus 600 can use in grouping battery energy storage systems under its control. These kinds of information correspond to schedule information, charge-discharge efficiency information, variation rate information, degradation information (SOH), and battery capacity information (SOC) which are stored in the battery information storage module 603. As described above, there are two grouping procedures, that is, a method that grouping is done after schedule setting and a method that grouping is done before schedule setting. Where as shown in FIG. 11(b) pieces of schedule information are set in respective battery energy storage systems (or user-side EMSs which manage battery energy storage systems) and then a grouping judgment is made on the basis of those pieces of schedule information, only battery energy storage systems for each of which a plan of charging periods and discharge periods in one day (24 hours) has already been set can join groups. On the other hand, where battery energy storage systems are grouped using respective pieces of battery specific information (charge-discharge efficiency information, variation rate information, degradation information, and battery capacity information) shown in FIG. 11(a) and then pieces of schedule information are set, the number of batteries that can join groups is flexible.

However, where battery energy storage systems are grouped using only respective pieces of battery specific information, as shown in FIG. 12 problem arise that battery energy storage systems (or user-side EMSs which manage battery energy storage systems) that are physically distant from each other may be used preferentially for grouping, as a result of which the power allocation efficiency is lowered (when they belong to different power distribution networks) or the communication message transmission/reception efficiency is lowered (when they belong to plural users).

In the embodiment, as shown in FIG. 11(a), grouping is performed using, in addition to pieces of battery specific information, pieces of location information (facility identifier and power distribution network identifier, GPS (global positioning system) information, address information, or the like). In FIG. 12, a group 1251 is a group that is formed under grouping conditions that three battery energy storage systems be selected that are largest or highest in battery specific information (e.g., battery capacity) and that they are identical in the power distribution network identifier of the location information. It is assumed that as indicated in FIG. 12 the battery capacity decreases in order of battery energy storage systems 1242, 1212, 1233, 1243, 1232, and 1221. On the other hand, a group 1252 is a group that is formed by selecting three battery energy storage systems that are largest or highest in battery specific information (e.g., battery capacity) under no condition relating to the location information. By comparing the groups 1251 and 1252, it is seen that the group 1251 which is formed taking the location information into consideration can attain higher efficiency in power distribution and communication.

The reason why the group 1251 can attain higher efficiency in power distribution is that all of the battery energy storage systems 1233, 1242, and 1243 of the group 1251 belong to the same power distribution network whereas the battery energy storage systems 1212, 1233, and 1242 of the group 1252 belong to two power distribution networks. That is, when a charge-discharge control is performed on the group 1251, since all of the battery energy storage systems 1233, 1242, and 1243 of the group 1251 belong to the power distribution network A, it is not necessary to supply power to the power distribution network B. For example, in the event of a planned power failure or the like, forming each group by battery energy storage systems that belong to one power distribution network enables a charge-discharge control using battery energy storage systems of a group that belong to a power distribution network that is not subjected to the planned power failure.

On the other hand, why the group 1251 can attain higher efficiency in communication is that the number of instructions that are given to user-side EMSs from the relay apparatus 1201 which performs charge-discharge controls on battery energy storage systems and corresponds to the charge-discharge instructing apparatus 600. More specifically, whereas the number of messages to be sent to the battery energy storage systems 1233, 1242, and 1243 of the group 1251 is two, the number of messages to be sent to the battery energy storage systems 1212, 1233, and 1242 of the group 1252 is three, because as mentioned above one charge-discharge instruction message is sent per user-side EMS.

In the above example, the grouping conditions relating to the location information and the battery specific information are that three battery energy storage systems be selected that are largest or highest in battery specific information (e.g., battery capacity) and that they are identical in the power distribution network identifier of the location information. However, the grouping conditions are not limited to the above. For example, the condition relating to the location information may be that power distribution network identifiers be such that corresponding power distribution networks are adjacent to each other. In the case of the power distribution networks shown in FIG. 7C, this condition may be such that battery energy storage systems that are adjacent to each other in any of the vertical, horizontal, and oblique directions are allowed to belong to a group. The condition relating to the location information may be a condition relating to information other than the power distribution network identifier, and may be a condition relating to the facility identifier for identification of a facility where a battery energy storage system is installed. The condition relating to the location information may be a combination of a condition relating to the power distribution network identifier and a condition relating to the facility identifier.

For example, the condition relating to the battery energy storage system location information (called a location condition) and the condition relating to the battery specific condition (called a specific condition) may be set according to functions that battery energy storage systems to constitute a group are expected to have.

FIG. 13 is a table of correspondence between functions that battery energy storage systems are expected to have, specific conditions of battery energy storage systems, and location conditions. In the example of FIG. 13, it is assumed that the functions that battery energy storage systems are expected to have are functions that the host EMS 1202 expects of the relay apparatus 1201 and the battery energy storage systems under its control. In the example of FIG. 13, a specific condition corresponding to a function that is short cycle control for preventing an instantaneous power failure in power infrastructure is a condition relating to the variation rate (output power (W)). A location condition corresponding to the same function is that battery energy storage systems be very close to each other, because this allows communication messages of supervisory controls to be transmitted and received efficiently in real time. The condition that battery energy storage systems be very close to each other can be expressed as a condition relating to the facility identifier, the power distribution network identifier, or the network identifier. For example, the condition that battery energy storage systems be very close to each other can be expressed as "power distribution network identifiers are the same or power distribution networks corresponding to power distribution network identifiers are adjacent to each other." Similar expressions are possible using other kinds of identifiers.

On the other hand, a specific condition corresponding to a function that is daytime operation control which is gentle and of a large scale is a condition relating to the magnitude of the battery capacity, because more reserve power can be used as the battery capacity increases. In the case of daytime operation control in which a response to a charge-discharge instruction is returned more slowly than in the case of short cycle control, the location condition relating to the distance between battery energy storage systems is larger in allowable range than in the case of short cycle control. An example location condition is that power distribution network identifiers are nor identical. Similar expressions are possible using other kinds of identifiers. The specific condition for battery energy storage systems may be set for either the whole of each group of battery energy storage systems or individual battery energy storage systems.

Figure 14:
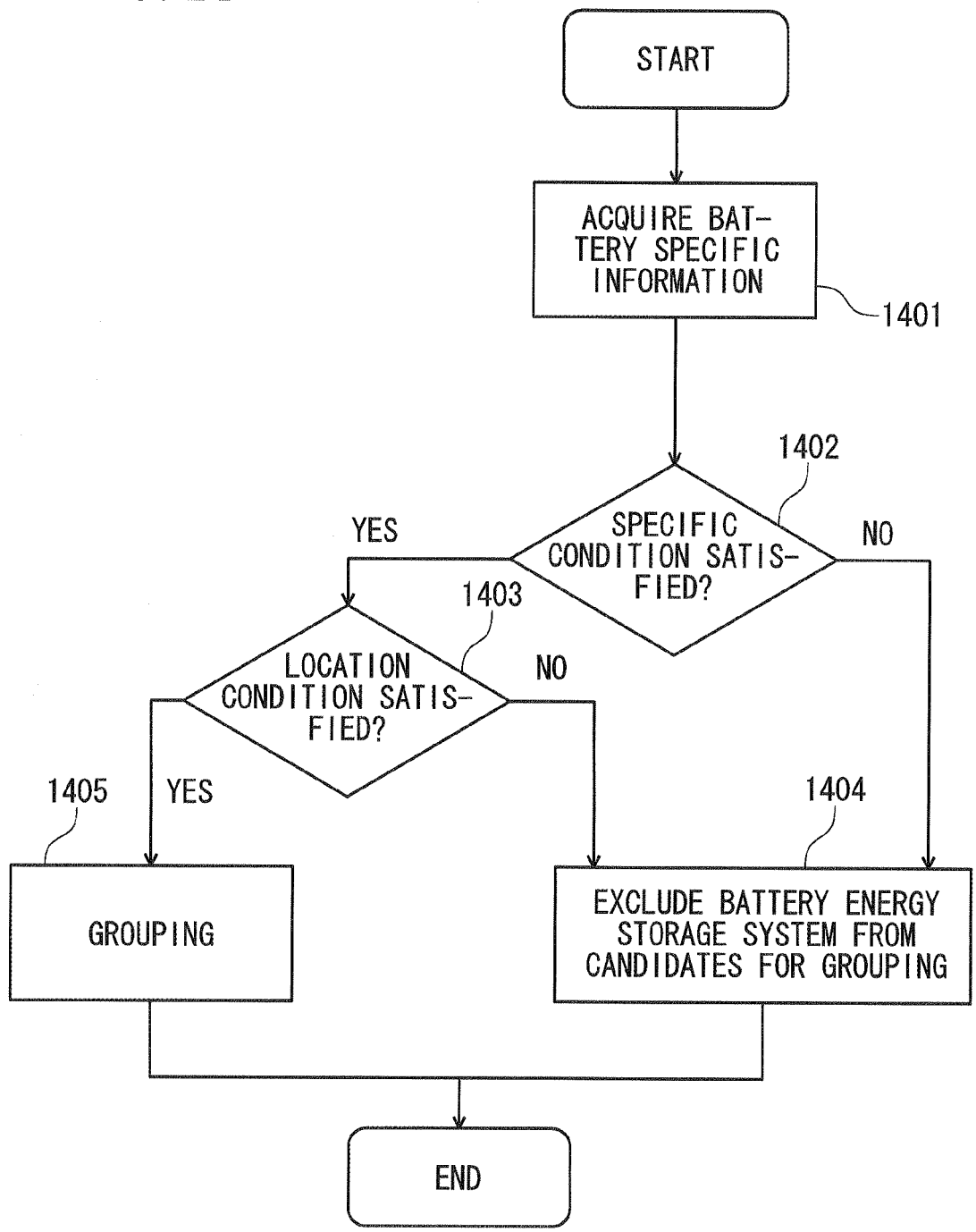
FIG. 14 is a flowchart of grouping which is performed by the charge-discharge instructing apparatus 600.

FIG. 14 is a flowchart of grouping which is performed by the charge-discharge instructing apparatus 600. At step S1402, it is judged whether or not battery specific information (charge-discharge efficiency information, variation rate information, degradation information, or battery capacity information) satisfies a grouping condition (e.g., the specific condition shown in FIG. 13). Then, at step S1403, a judgment using a location condition (e.g., the one shown in FIG. 13) is made. In the embodiment, judgments may be made in opposite order; that is, a judgment using a specific condition may be made after a judgment using a location condition.

Figure 15:
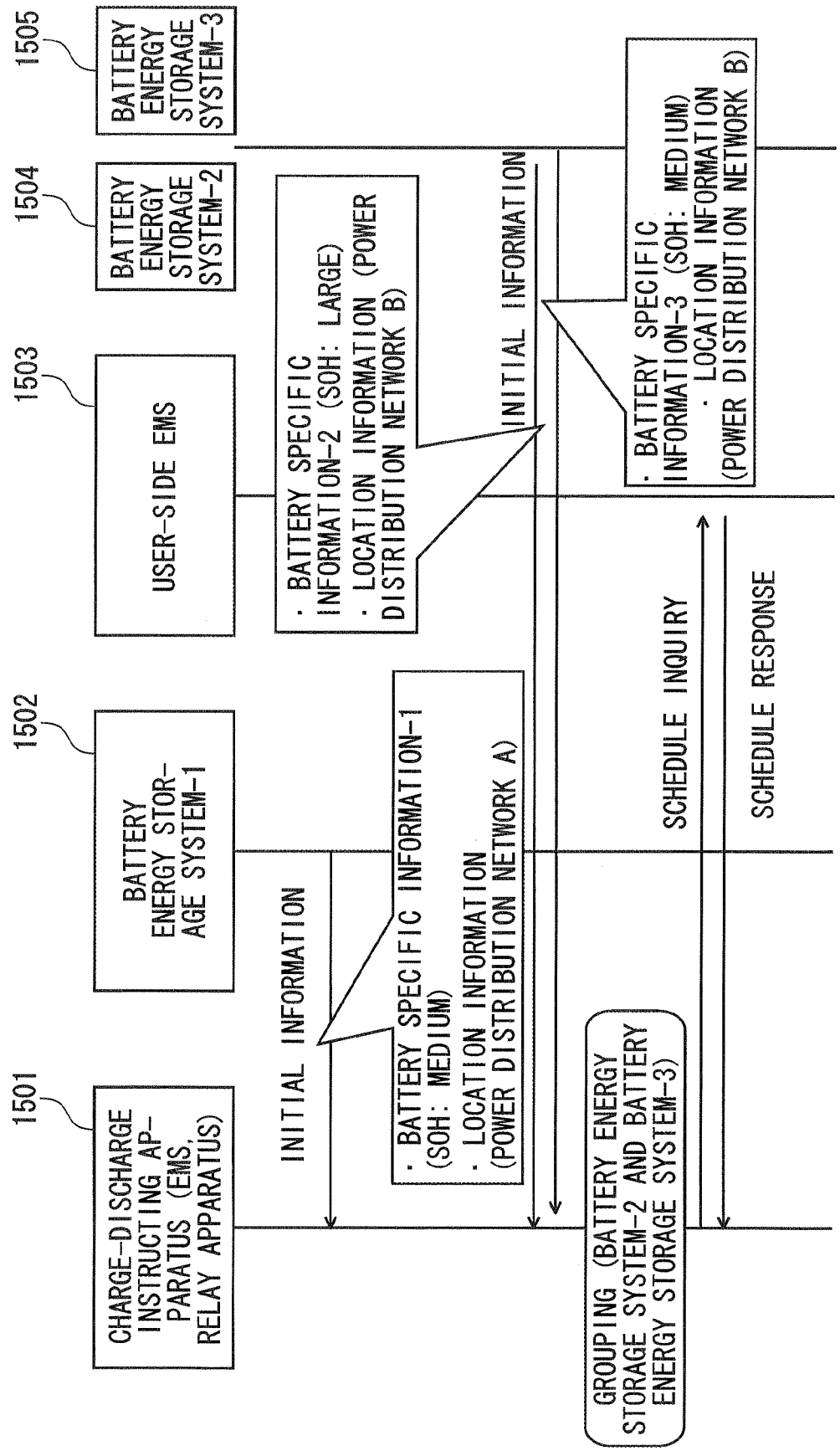
FIG. 15 is a sequence diagram grouping which is performed by the charge-discharge instructing apparatus 600.

FIG. 15 shows a communication sequence which is followed by a charge-discharge instructing apparatus 1501 (corresponds to the charge-discharge instructing apparatus 600 shown in FIG. 6) in forming a group by selecting two battery energy storage systems from plural battery energy storage systems (battery energy storage system-1 1502, battery energy storage system-2 1504, and battery energy storage system-3 1505). In the example of FIG. 15, battery energy storage system-2 1504, and battery energy storage system-3 1505 which are physically close to each other are selected.

FIG. 16 is a block diagram showing the configuration of the charge-discharge determining apparatus 1600 according to the embodiment. The charge-discharge determining apparatus 1600 includes a power supply module 1601, a charge-discharge managing module 1602, a battery information storage module 1603, a charge-discharge group determining module 1604, a battery information acquiring module 1605, a battery information communicator 1606, a second communication module 1607, and a first communication module 1608.

The power supply module 1601 performs DC/AC conversion, power frequency monitoring, detection and suppression of a voltage variation, etc. And the power supply module 1601 performs a charge-discharge control on the battery unit (BMU) according to an instruction transmitted from the charge-discharge instructing apparatus 600. In the embodiment, a charge-discharge control can likewise be performed using another parameter "current hour" (A·h) or "voltage hour" (V·h) instead of the parameter "electric energy" (W·h). In general, electric energy can be calculated as the product of a current and a voltage.

In the embodiment, the battery information storage module 1603 stores battery specific information, location information, and charge-discharge control information which are necessary in performing a charge-discharge control on the battery unit (BMU). The charge-discharge managing module 1602 manages the charge-discharge control information.

Figure 17:
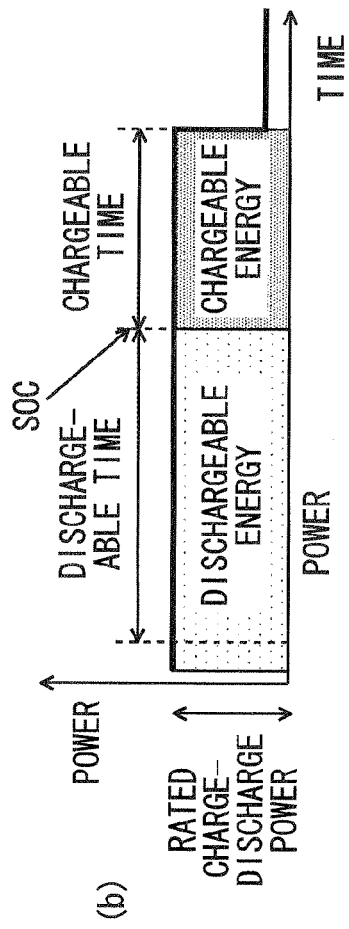
FIG. 17 shows examples of various kinds of information which are stored in a battery information storage module 1603 shown in FIG. 16.

FIGS. 17(a)-17(c) show the battery specific information, the location information, and the charge-discharge control information, respectively. The battery specific information is pieces of information that indicate electrical characteristics specific to a battery unit (BMU) and is necessary for a charge-discharge control. In the example of FIG. 17(a), the battery specific information includes rated charge-discharge power (W), a rated capacity (W·h), a state of charge (SOC; %), and a dischargeable time and a chargeable time which are correlated with the SOC. In the case of the constant current charging method which is a common charging method of battery units, the input/output power (current) of the battery cells of a battery unit (BMU) is kept constant until the SOC (%) reaches a prescribed threshold value. Therefore, as shown in a graph of FIG. 17 (b), by acquiring an SOC value from the battery unit, the charge-discharge determining apparatus 1600 can calculate a corresponding chargeable time and dischargeable time (on the horizontal axis of the graph), a maximum charge-discharge power (vertical axis of the graph), electric energy values necessary for charging and discharge (products of the power and the chargeable time and the dischargeable time). The constant current charging method has a feature that the current that is necessary for charging is minimized after the SOC has exceeded the prescribed threshold value. As mentioned above, in charge-discharge controls, another parameter "current hour" (A·h) or "voltage hour" (V·h) may be used instead of the parameter "electric energy" (W·h). An item "type" indicates an apparatus type such as a battery, a solar power generator, a wind power generator, or a heat accumulation apparatus and is used when the charge-discharge instructing apparatus 600 determines a charge-discharge group. For example, a solar power generator and a wind power generator are classified as discharge-dedicated apparatus. A heat accumulation apparatus is classified as a charging-dedicated apparatus.

The location information shown in FIG. 17 (c) indicates a physical installation position of the battery energy storage system (or the user-side EMS which manages the battery energy storage system).

The charge-discharge control information shown in FIG. 17(d) is used for recognizing a charge-discharge operation state of the battery energy storage system. For example, when the battery energy storage system is to be controlled in real time to prevent an instantaneous power failure in a power network, it is desirable that the charge-discharge determining apparatus 1600 perform an on-demand operation in which it sends or receives a communication message relating to a charge-discharge control instruction when necessary. On the other hand, when the battery energy storage system is to be controlled at relatively long intervals in a nighttime time slot, it is desirable that the charge-discharge determining apparatus 1600 perform a planned operation in which an operation timing schedule of charge-discharge controls is set.

Charge-discharge power information relates to the charge-discharge managing module 1602. The charge-discharge managing module 1602 manages the charge-discharge power information and charge-discharge judgment information which relate to charge-discharge control of the battery energy storage system, and supplies these pieces of information to the charge-discharge group determining module 1604. The charge-discharge power information includes rated discharge power, rated charging power, a dischargeable time (updated when necessary as charging or discharge proceeds), a chargeable time (ditto), and permitted electric energy.

The battery information communication module 1606 generates a communication message relating to an access control or charge-discharge power information that is acquired from the battery unit (BMU) by the charge-discharge determining apparatus 1600, and sends it to the charge-discharge instructing apparatus 600 on the communication network via the first communication module 1608. The communication message will be described later in detail.

The first communication module 1608 can be realized by using a wired communication medium such as an optical fiber, a telephone line, or an Ethernet (registered trademark) or a wireless communication medium. However, in the embodiment, the first communication module 1608 does not rely on a particular communication medium.

The charge-discharge determining apparatus 1600 receives a charge-discharge control instruction from the charge-discharge instructing apparatus 600 after a permission judgment is made in an access control.

The battery information acquiring module 1605 acquires, via the second communication module 1607, specific information (rated capacity, charge-discharge terminal voltages, upper limit temperature, lower limit temperature, maximum charge-discharge currents, rated voltage, etc.). The battery information acquiring module 1605 also acquires, regularly, state information (SOC, SOH, charge-discharge current, and charge-discharge voltage) which is variable information during operation of the battery unit (BMU).

The second communication module 1607 can be realized by using a communication medium such as a CAN which is a common interface standard for battery units (BMUs) or an Ethernet (registered trademark) or an electric signal line that is prescribed independently by a vendor of the battery energy storage system. However, in the embodiment, the second communication module 1607 does not rely on a particular medium.

In general, self-discharge occurs in battery cells. Therefore, it is not sufficient for a battery energy storage system that operates as the charge-discharge determining apparatus 1600 to send only once such information as an SOC and an SOH to an EMS that operates as the charge-discharge instructing apparatus 600; since their values vary every moment, it is desirable to update the values in real time. In the embodiment, in charge-discharge controls, another parameter "current hour" (A·h) or "voltage hour" (V·h) may be used instead of the parameter "electric energy" (W·h). In general, electric energy can be calculated as the product of a current and a voltage.

As mentioned above, the application range of the charge-discharge determining apparatus 1600 according to the embodiment is not limited to PCSs which are connected to batteries. Instead, the charge-discharge determining apparatus 1600 can be used in PCSs for s and wind power generators, and can likewise be used in external controllers (not PCSs themselves) which have a communication function and hence can communicate with a battery, a solar power generator, or a wind power generator and a charge-discharge instructing apparatus. Thus, the application range of the charge-discharge determining apparatus 1600 is not limited to a particular kind of apparatus.

As described above, the charge-discharge instructing apparatus 600 according to the embodiment has been invented to solve the problems that arise when a set of battery energy storage systems is dealt with as a single logical battery energy storage system (logical grouping) and plural battery users are given a joint use right to use it, the problems relating to the characteristics of the communication systems and the communication bandwidth. The charge-discharge instructing apparatus 600 enables formation of a large-scale system while maintaining high flexibility in installation of battery energy storage systems.

Finally, FIGS. 19(*a*) and 19(*b*) show communication messages to be exchanged between the charge-discharge instructing apparatus 600 and the charge-discharge determining apparatus 1600. FIG. 19(*a*) shows a communication message relating to battery specific information and location information, and FIG. 19(*b*) shows a communication message relating to charge-discharge schedule information. Each communication message contains a TCP/IP (transmission control protocol/Internet protocol) communication header and an identifier for identification of a message content. Information that relates to a charge-discharge group or a charge-discharge control and is sent from the charge-discharge instructing apparatus 600 can include contents that are directed to plural charge-discharge determining apparatus 1600 by using number information. Examples of specific methods for constructing such communication messages are to follow the procedure of a standard such as IEC 61850 which prescribes a communication specification relating to distribution type power sources and to follow the procedure of a Web service using XML (extensible markup language). However, in the embodiment, such communication messages can be constructed freely according to application sites instead of relying on a particular protocol. The contents of communication messages are not limited to those shown in FIGS. 19(*a*) and 19(*b*) and, if necessary, may be adapted as appropriate according to specifications of a related standard etc.

By forming groups using both of battery specific information and location information, the above-described embodiment provides an advantage that it can solve the problem that batteries that are physically distant from each other may be used preferentially to form a group, as a result of which the power allocation efficiency or the communication efficiency is lowered.

For example, the charge-discharge instructing apparatus 600 can be implemented using a general-purpose computer as basic hardware. That is, the battery information communicator 605, the battery information storage module 603, the charge-discharge group determining module 604, the charge-discharge managing module 602, the communication module 606, and the demand-supply adjuster 601 can be realized by causing a processor of the computer to run programs. The programs may either be preinstalled in the computer or be stored in a storage medium such as a CD-ROM or be delivered over a network and installed in the computer when necessary. The battery information storage module 603 can be implemented using, as appropriate, a memory or a hard disk drive that is incorporated in or externally connected to the computer or a storage medium such as a CD-R, CD-RW, a DVD-RAM, or a DVD-R.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A charge-discharge instructing apparatus, comprising:
a processor and memory configured to execute software instructions embodied within modules, the modules including:
an acquiring module configured to acquire specific information and location information for each of a plurality of battery energy storage systems, wherein the specific information represents an electrical characteristic of a battery of each of the battery energy storage systems, and the location information represents an installation location of each of the battery energy storage systems;
a group determining module configured to group the battery energy storage systems into groups each including two or more battery energy storage systems, based on the specific information and the location information; and
a managing module configured to send charge-discharge control instructions to the battery energy storage systems on a group-by-group basis, wherein
the battery energy storage systems are grouped based on the specific information of the battery energy storage systems meeting a specific condition for an electrical characteristic, and
the battery energy storage systems are also grouped based on the location information of the battery energy storage systems meeting a location condition for an installation location.

2. The apparatus of claim 1, wherein
the managing module comprises a module configured to calculate a sum of charge-discharge power values of the battery energy storage systems belonging to the same group.

3. The apparatus of claim 1, wherein
the specific condition and the location condition are determined depending on a function required for the battery energy storage systems belonging to the groups.

4. The apparatus of claim 1, wherein
each of the battery energy storage systems is located in one of a plurality power distribution networks,
the location information comprises an identifier that identifies a power distribution network in which a battery energy storage system is located, and
battery energy storage systems correlated with the same power distribution network identifier constitute a group.

5. The apparatus of claim 4, wherein
according to the location condition, identifiers of the battery energy storage systems identify the same power distribution network.

6. The apparatus of claim 1, wherein the specific information comprises a state of charge (SOC) of the batteries of the battery energy storage systems.

7. The apparatus of claim 1, wherein the specific information comprises a maximum charge-discharge current of the batteries of the battery energy storage systems.

8. The apparatus of claim 1, wherein the specific information comprises a state of health (SOH) of the batteries of the battery energy storage systems.

9. The apparatus of claim 1, wherein the specific information comprises charge-discharge efficiency of the batteries of the battery energy storage systems.

10. The apparatus of claim 1, wherein the location information comprises identifiers of facilities where each battery energy storage system is installed.

11. A non-transitory computer-readable medium storing a program which, when executed by a computer, causes the computer to perform operations comprising:
(a) acquiring specific information and location information for each of a plurality of battery energy storage systems, wherein the specific information represents an electrical characteristic of a battery of each of the battery energy storage systems, and the location information represents an installation location of each of the battery energy storage systems;
(b) group the battery energy storage systems into groups each including two or more battery energy storage systems, based on the specific information and the location information; and
(c) sending charge-discharge control instructions to the battery energy storage systems on a group-by-group basis, wherein
the battery energy storage systems are grouped based on the specific information of the battery energy storage systems meeting a specific condition for an electrical characteristic, and
the battery energy storage systems are also grouped based on the location information of the battery energy storage systems meeting a location condition for an installation location.

12. The apparatus of claim 3, wherein the function required for the battery energy storage systems belonging to the groups is a short cycle control or a daytime operation control.

13. A charge-discharge instructing apparatus, comprising:
a processor and memory configured to execute software instructions embodied within modules, the modules including:
an acquiring module configured to acquire specific information and location information for each of a plurality of battery energy storage systems, wherein the specific information represents an electrical characteristic of a battery of each of the battery energy storage systems, and the location information represents an installation location of each of the battery energy storage systems;
a group determining module configured to group the battery energy storage systems into at least a first group and a second group different from the first group, based on the specific information and the location information; and
a managing module configured to send charge-discharge control instructions to the battery energy storage systems on a group-by-group basis, the managing module being configured to:

i) send a charge-discharge control instruction to the battery energy storage systems belonging to the first group in accordance with a short cycle control; and ii) send a charge-discharge control instruction to the battery energy storage systems belonging to the second group in accordance with a daytime operation control, wherein the battery energy storage systems are grouped based on the specific information of the battery energy storage systems meeting a specific condition for an electrical characteristic, and the battery energy storage systems are also grouped based on the location information of the battery energy storage systems meeting a location condition for an installation location.

14. The apparatus of claim 1, wherein the managing module manages each group of battery energy storage systems as a single logical entity.

15. The non-transitory computer-readable medium of claim 11, wherein each group of battery energy storage systems is managed as a single logical entity.

16. The apparatus of claim 13, wherein the managing module manages each group of battery energy storage systems as a single logical entity.

* * * * *